(12) United States Patent
Clark

(10) Patent No.: US 10,282,429 B2
(45) Date of Patent: May 7, 2019

(54) HAZARDOUS MATERIALS INCIDENT LOCATION SYSTEM AND USES THEREOF

(71) Applicant: Latissha Varina Clark, Houston, TX (US)

(72) Inventor: Latissha Varina Clark, Houston, TX (US)

(*) Notice: Subject to any disclaimer, the term of this patent is extended or adjusted under 35 U.S.C. 154(b) by 633 days.

(21) Appl. No.: 14/453,198

(22) Filed: Aug. 6, 2014

(65) Prior Publication Data

US 2015/0046491 A1 Feb. 12, 2015

Related U.S. Application Data

(60) Provisional application No. 61/862,692, filed on Aug. 6, 2013.

(51) Int. Cl.
*G06F 17/30* (2006.01)

(52) U.S. Cl.
CPC .. *G06F 17/30241* (2013.01); *G06F 17/30545* (2013.01)

(58) Field of Classification Search
CPC ............... G06F 17/30241; G06F 17/30545
USPC .......................................................... 707/770
See application file for complete search history.

(56) References Cited

U.S. PATENT DOCUMENTS

| 8,520,002 B2* | 8/2013 | Stambaugh | G06F 3/04817 345/441 |
| 9,354,789 B2* | 5/2016 | Stambaugh | |
| 2010/0217879 A1* | 8/2010 | Weiner | H04L 41/12 709/228 |
| 2013/0311910 A1* | 11/2013 | Stambaugh | G06F 3/04817 715/760 |

* cited by examiner

*Primary Examiner* — Sheree N Brown
(74) *Attorney, Agent, or Firm* — Benjamin Aaron Adler

(57) ABSTRACT

Provided herein are systems for locating one or more hazardous material incidents, for example, a petrochemical incident, in a geographical area of interest. The system generally comprises electronic device with at least a processor, a memory and a display coupled to the processor and at least one network connection; and a user interactive tool coupled to the electronic device. Particularly, the interactive tool or interactive mapping tool comprises activatable widgets in an interface, databases accessible by the widgets and a mapping application and displayable interactive base map. Also provided is a method and utilizing the system to locate hazardous material incidents by activating the widgets, querying the databases and displaying incident data retrieved from the databases on the base map. Further provided is a non-transitory machine-readable storage device comprising processor-executable instructions to perform the method.

9 Claims, 23 Drawing Sheets

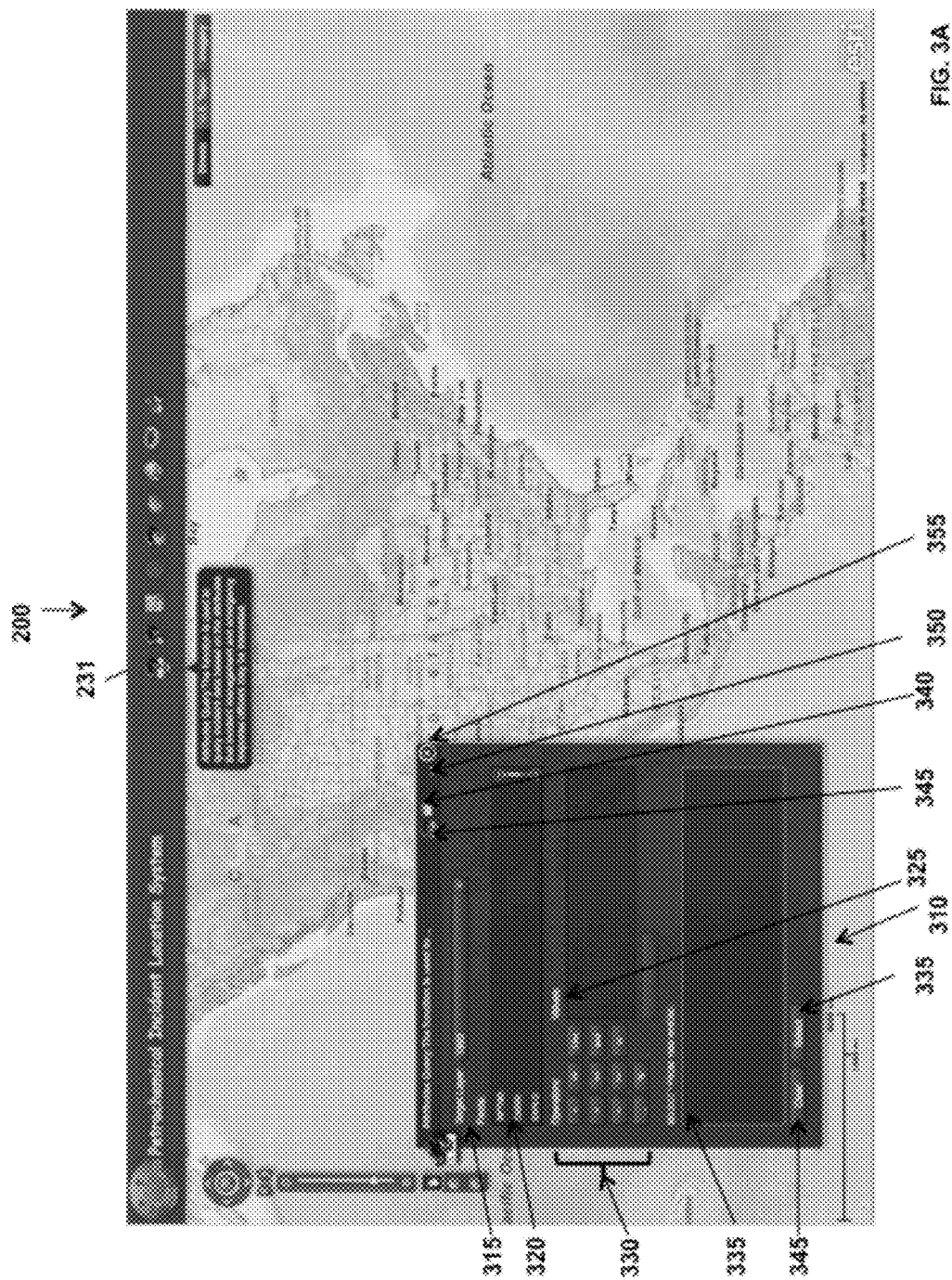

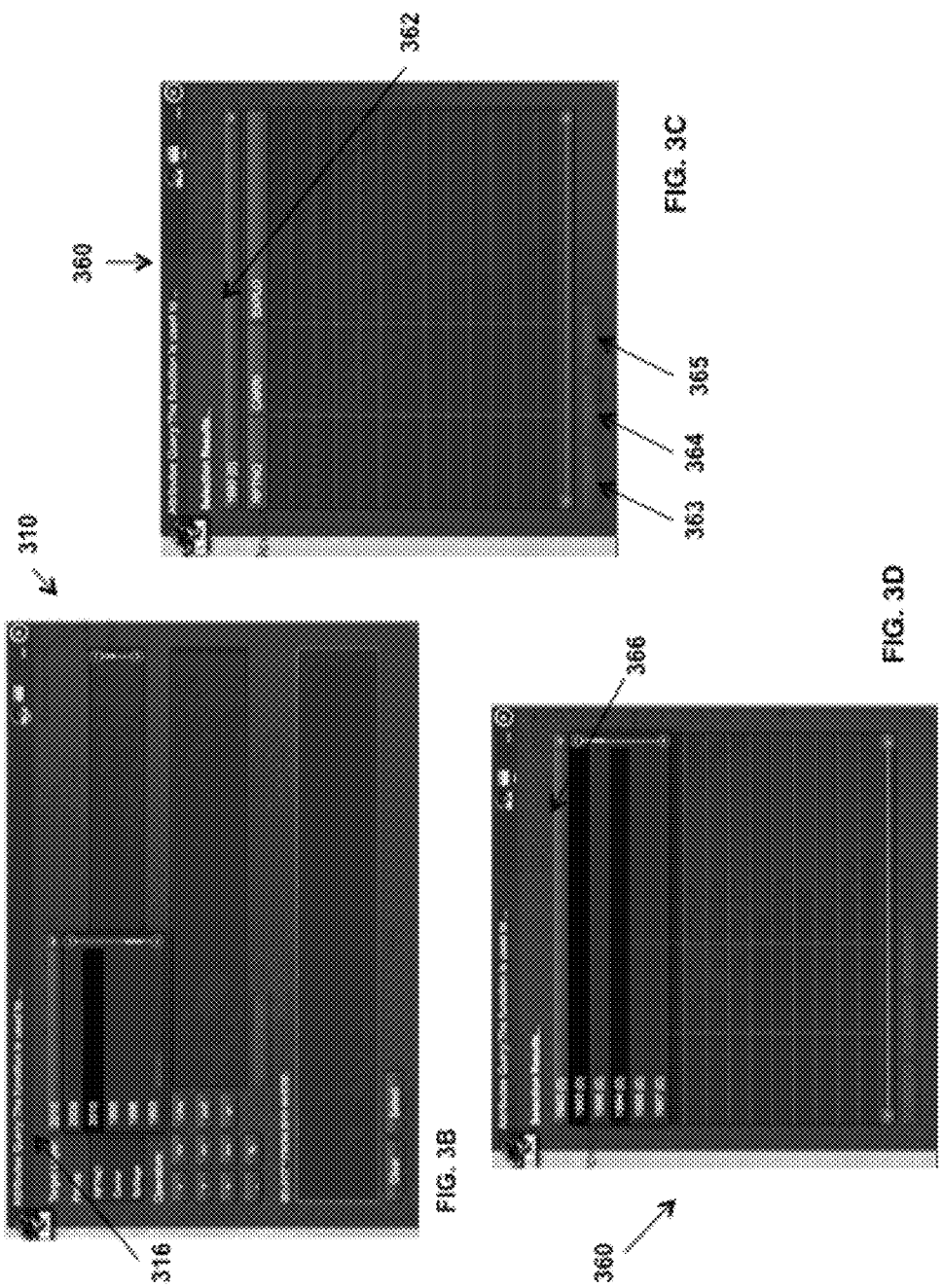

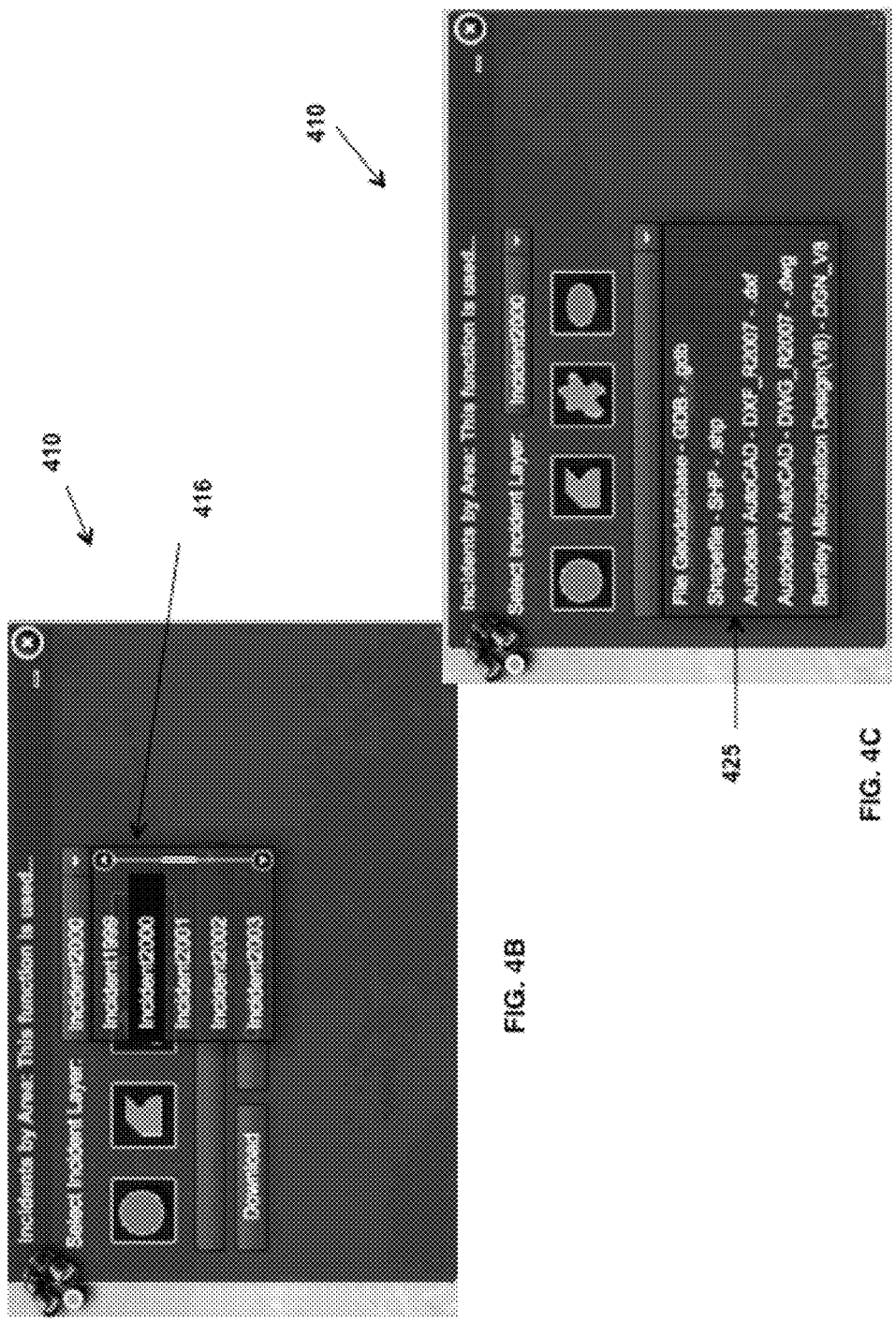

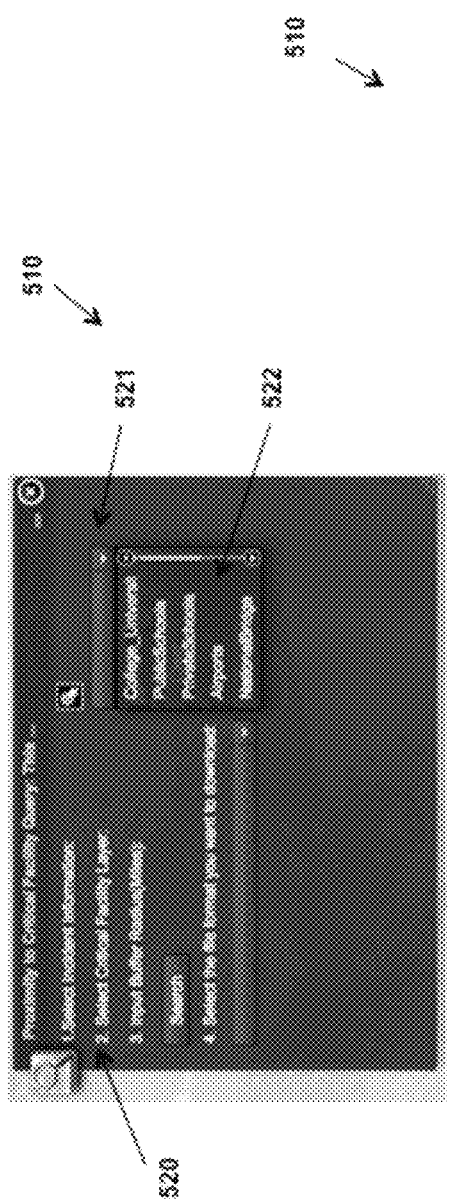
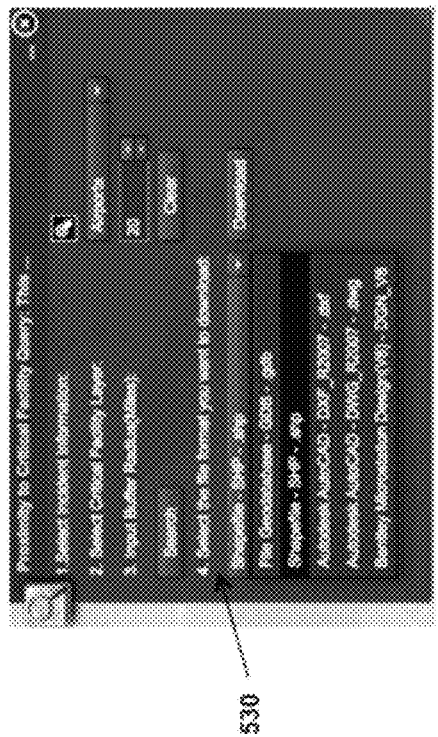
FIG. 5C
FIG. 5D

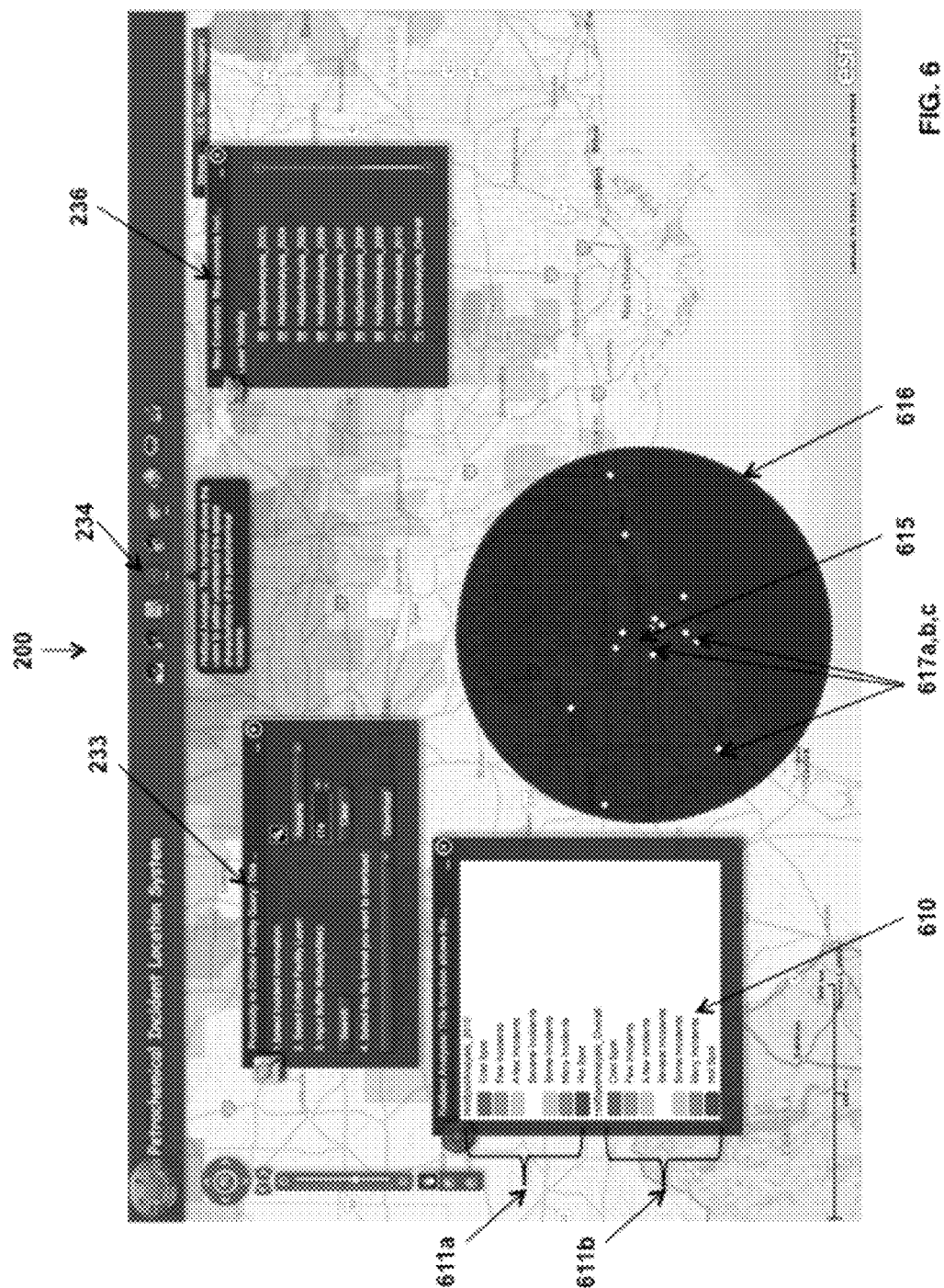

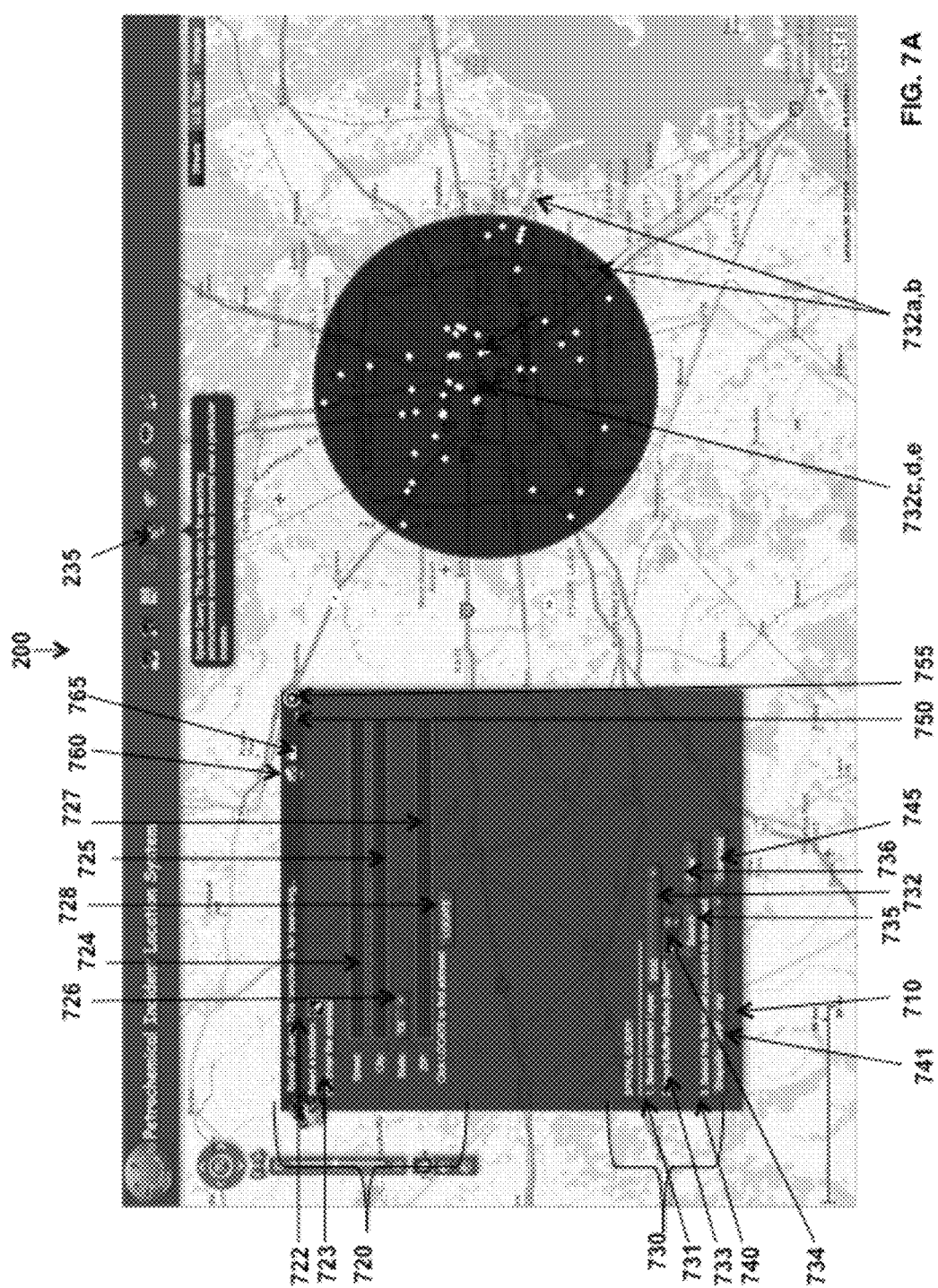

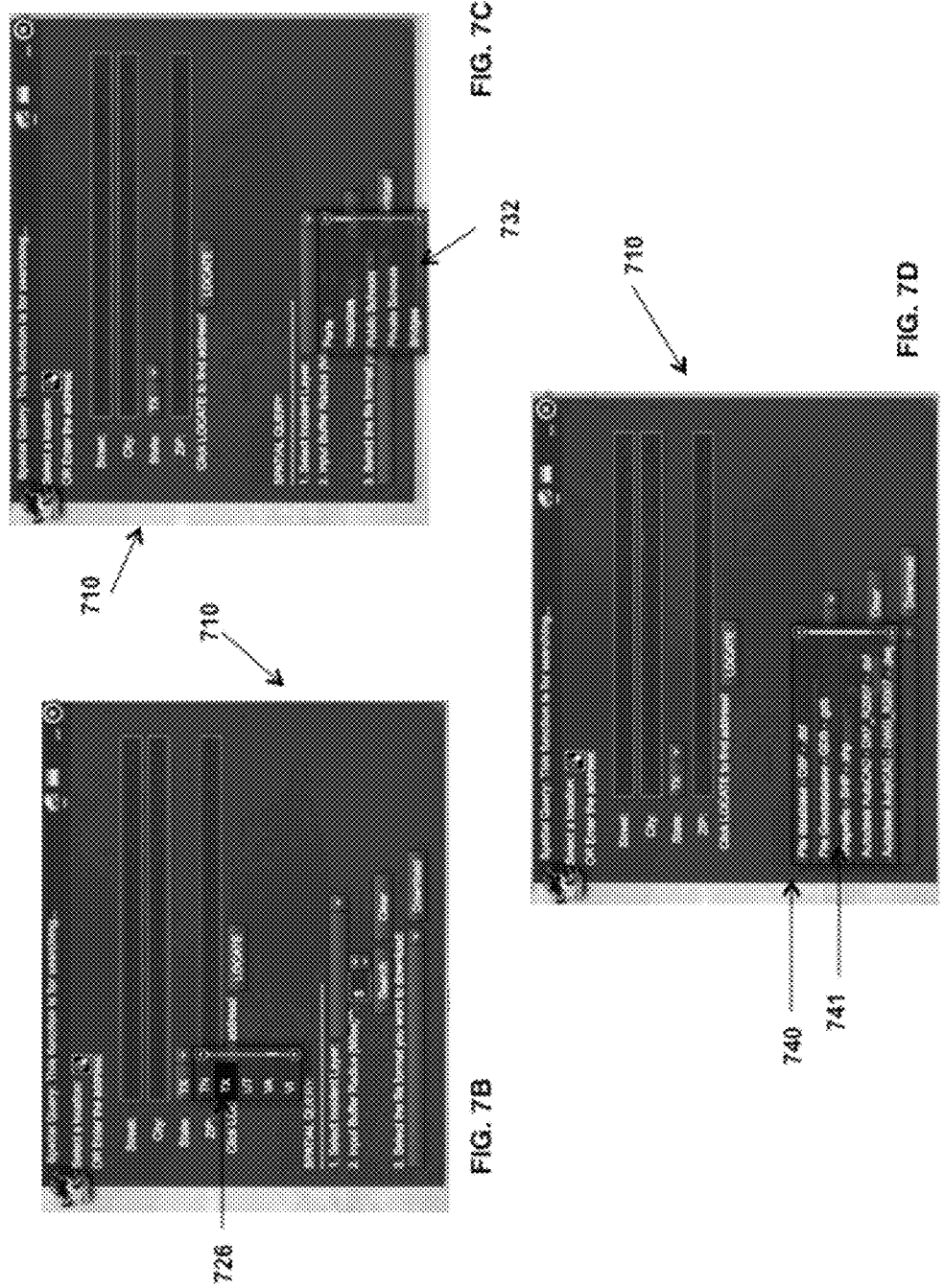

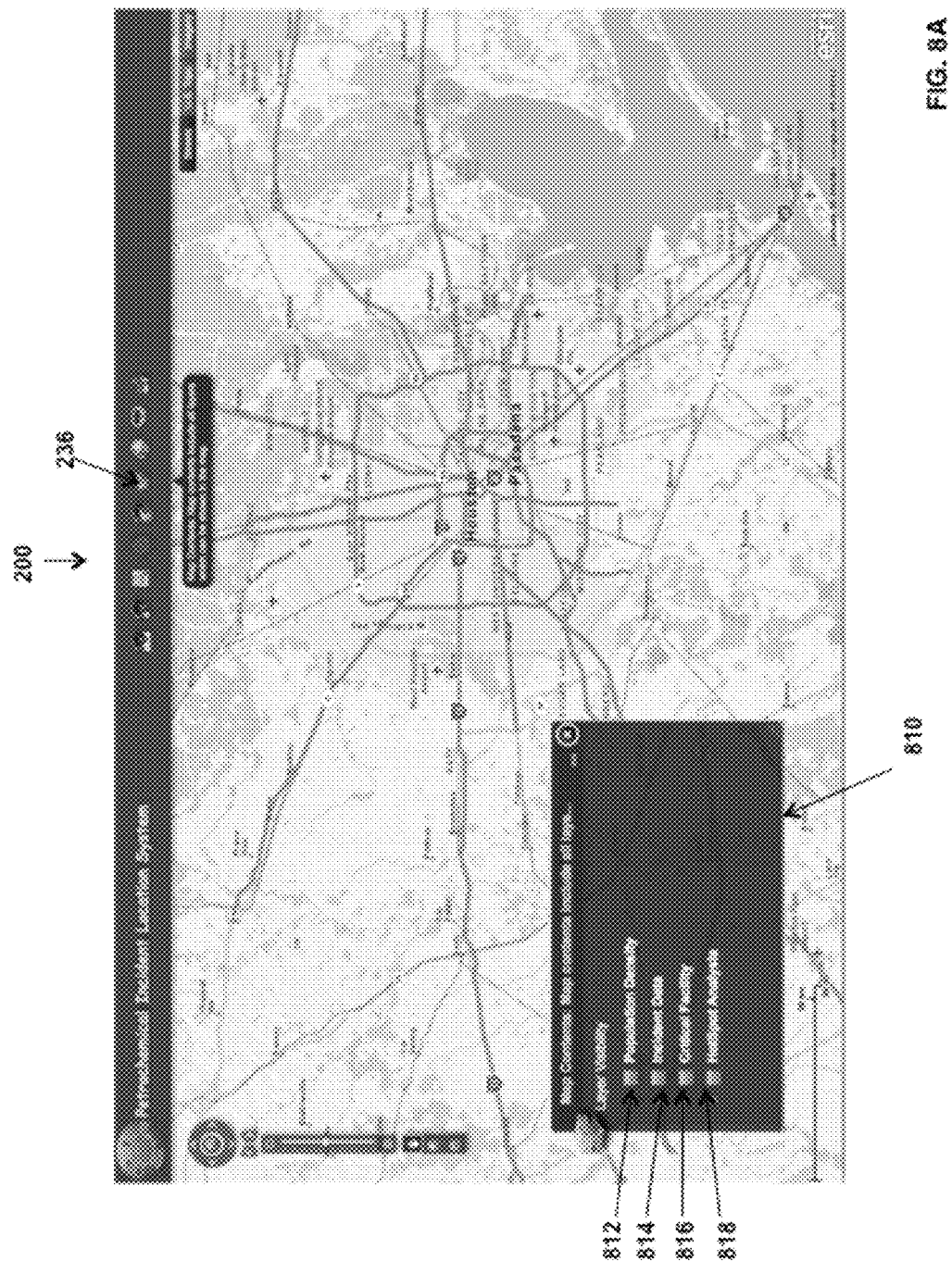

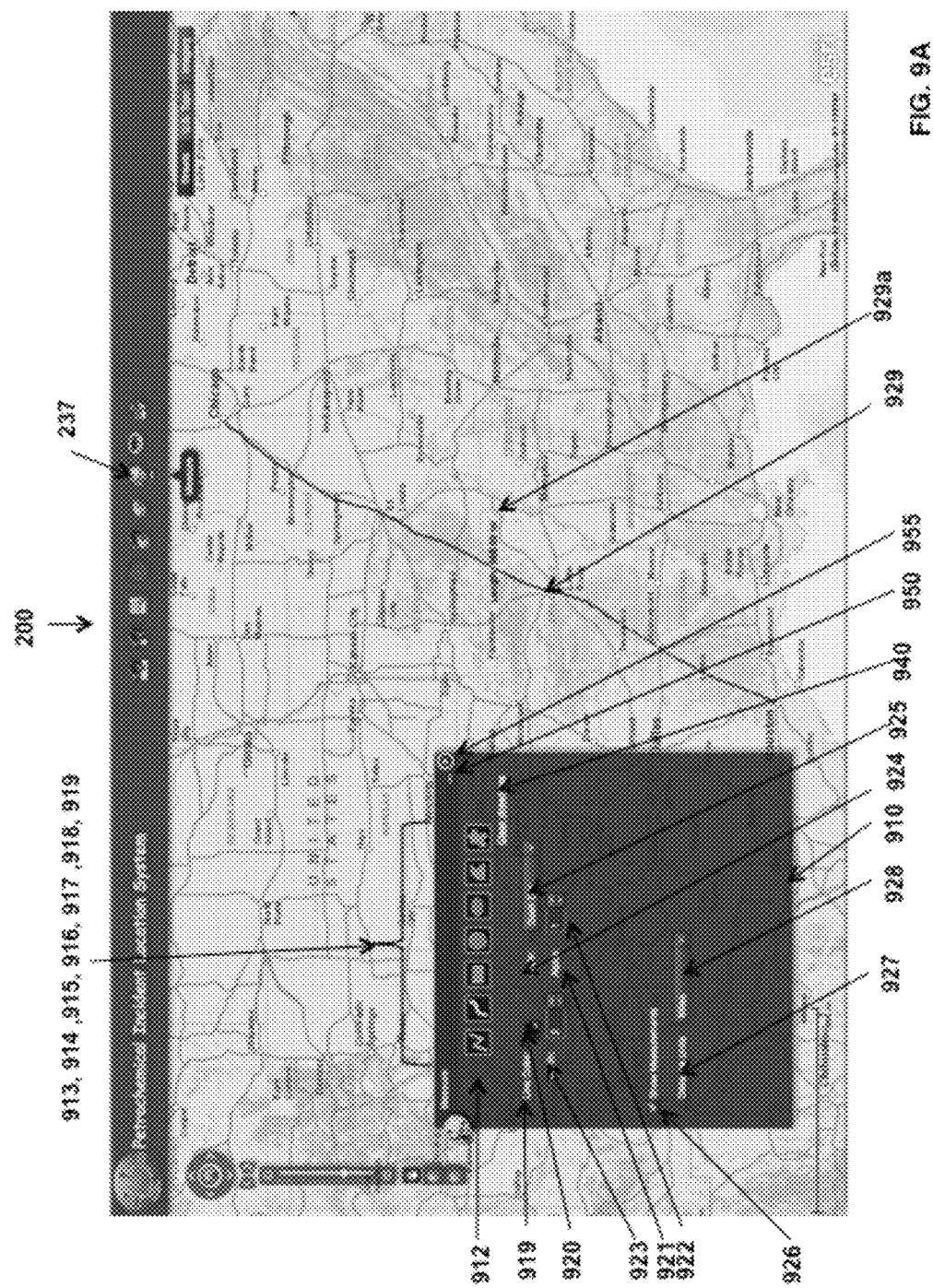

HAZARDOUS MATERIALS INCIDENT LOCATION SYSTEM AND USES THEREOF

CROSS-REFERENCE TO RELATED APPLICATIONS

This nonprovisional application claims benefit of priority under 35 U.S.C. § 119(e) of provisional application U.S. Ser. No. 61/862,692, filed Aug. 6, 2013, the entirety of which is hereby incorporated by reference.

GOVERNMENTAL SPONSORSHIP

This invention was created in part under Department of Homeland Security Science and Technology contract number 2008-ST-061-TS0005. The government has certain rights in this invention.

COMPUTER PROGRAM LISTING APPENDIX

A Computer program listing is submitted on compact disc in compliance with 37 C.F.R. § 1.96 and are incorporated by reference herein. A total of two (2) compact discs (including duplicates) are submitted herein. The files on each compact disc are listed below, but are in text format:

| Files | Size (KB) | Date Created |
|---|---|---|
| config-edit.txt | 4 | Aug. 03, 2014 |
| config.txt | 12 | Aug. 03, 2014 |
| defaults.txt | 4 | Aug. 03, 2014 |
| DynamicLegendWidget.txt | 4 | Oct. 09, 2012 |
| LegendWidget.txt | 4 | Oct. 09, 2012 |
| LocateWidget_US.txt | 8 | Oct. 09, 2012 |
| MeasureDistance.txt | 4 | Oct. 09, 2012 |
| SelectionWidget.txt | 16 | Oct. 09, 2012 |
| AttributesQuery | | |
| AttributesQueryWidget.txt | 4 | Aug. 03, 2014 |
| AttributesQueryWidget2.txt | 12 | Jun. 21, 2011 |
| ClosestFacility | | |
| ClosestFacilityWidget.txt | 4 | Aug. 03, 2014 |
| ClosestFacilityWidget2.txt | 20 | Sep. 26, 2012 |
| Data Extract | | |
| DataExtractWidget.txt | 4 | Jun. 27, 2010 |
| DataExtractWidget2.txt | 29 | Oct. 15, 2012 |
| Draw | | |
| DrawWidget.txt | 66 | Jun. 27, 2011 |
| DrawWidget2.txt | 4 | Sep. 18, 2010 |
| DrawWidgetBoldFontButtonSkin | 12 | Oct. 08, 2010 |
| DrawWidgetItalicFontButtonSkin | 12 | Dec. 06, 2010 |
| DrawWidgetUnderlineTextButtonSkin | 12 | Dec. 06, 2010 |
| eSearch | | |
| alphaSliderSkin.txt | 8 | Mar. 15, 2011 |
| ExportButtonSkin.txt | 8 | Mar. 15, 2011 |
| HyperLinkColumn.txt | 4 | Mar. 15, 2011 |
| ResizeTitleWindowSkin.txt | 16 | Mar. 15, 2011 |
| SearchResultItemRenderer.txt | 8 | Jun. 16, 2011 |
| SearchWidget.txt | 33 | May 07, 2012 |
| SearchWidget2.txt | 86 | Jul. 18, 2012 |
| SearchWidget3.txt | 98 | Jul. 13, 2012 |
| SearchWidgetFloatDG.txt | 29 | Jul. 18, 2012 |
| SearchWidgetFloatDGSkin.txt | 16 | Mar. 15, 2011 |
| WidgetCloseButtonSkin.txt | 18 | Mar. 15, 2011 |
| Hotspot | | |
| HotspotWidget.txt | 4 | May 02, 2012 |
| HotspotWidget2.txt | 8 | May 18, 2011 |
| IncidentsArea | | |
| IncidentsAreaWidget.txt | 4 | May 01, 2012 |
| IncidentsAreaWidget2.txt | 16 | Jun. 04, 2012 |
| LayerList | | |
| LayerListWidget.txt | 4 | Oct. 12, 2010 |
| LayerListWidget2.txt | 4 | Jun. 07, 2010 |
| MapSwitcher | | |
| MapSwitcherWidget.txt | 4 | Oct. 15, 2010 |
| MapSwitcherWidget2.txt | 12 | Mar. 23, 2011 |
| Navigation | | |
| eButtonSkin.txt | 4 | Sep. 15, 2010 |
| IconButtonSkin.txt | 4 | Sep. 15, 2010 |
| InnerButtonSkin.txt | 4 | Sep. 15, 2010 |
| Navigation.txt | 12 | Sep. 15, 2010 |
| NavigationSkin.txt | 4 | Oct. 15, 2012 |
| NavigationWidget.txt | 4 | Oct. 15, 2012 |
| NavigationWidget2.txt | 8 | Mar. 23, 2011 |
| nButtonSkin.txt | 4 | Sep. 15, 2010 |
| neButtonSkin.txt | 4 | Sep. 15, 2010 |
| nwButtonSkin.txt | 4 | Sep. 15, 2010 |
| sButtonSkin.txt | 4 | Sep. 15, 2010 |
| seButtonSkin.txt | 4 | Sep. 15, 2010 |
| swButtonSkin.txt | 4 | Sep. 15, 2010 |
| VerticalButtonBarSkin.txt | 4 | Sep. 15, 2010 |
| wButtonSkin.txt | 4 | Sep. 15, 2010 |
| Print | | |
| PrintWidget.txt | 4 | Dec. 02, 2010 |
| PrintWidget2.txt | 8 | Oct. 19, 2010 |
| Query | | |
| QueryResultItemRenderer.txt | 8 | Sep. 14, 2010 |
| QueryWidget_carriername_.txt | 4 | May 02, 2012 |
| QueryWidget_Earthquakes.txt | 4 | Sep. 17, 2010 |
| QueryWidget_Louisville_TrafficCams.txt | 4 | Sep. 17, 2010 |
| QueryWidget.txt | 41 | May 11, 2011 |
| Time | | |
| TimeWidget_QuakesSince1970.txt | 4 | May 04, 2012 |
| TimeWidget.txt | 4 | May 04, 2010 |
| TimeWidget2.txt | 12 | Nov. 19, 2010 |
| WidgetContainer | | |
| WidgetContainer.txt | 29 | Jun. 26, 2012 |
| WidgetContainerWidget.txt | 49 | Sep. 15, 2010 |
| Bookmark | | |
| BookmarkItemRenderer.txt | 4 | Sep. 15, 2010 |
| BookmarkWidget.txt | 4 | Sep. 15, 2010 |
| BookmarkWidget2.txt | 12 | Oct. 17, 2010 |
| Edit | | |
| EditWidget.txt | 4 | Jul. 01, 2010 |
| EditWidget2.txt | 33 | Dec. 06, 2010 |
| EditWidgetAttachmentInspectorCancelButtonSkin.txt | 12 | Sep. 15, 2010 |
| EditWidgetAttachmentInspectorSkin.txt | 12 | Oct. 22, 2010 |
| EditWidgetAttachmentInspectorSubmitButtonSkin.txt | 12 | Sep. 15, 2010 |
| EditWidgetAttachmentRenderer.txt | 8 | Sep. 15, 2010 |
| EditWidgetAttributeInspectorSkin.txt | 4 | Dec. 03, 2010 |
| EditWidgetTemplatePickerListItemRenderer | 8 | Sep. 15, 2010 |
| EditWidgetTemplatePickerSkin.txt | 33 | Aug. 17, 2010 |
| GeoRSS | | |
| GeoRSSFeedItemRenderer.txt | 8 | Sep. 14, 2010 |
| GeoRSSWidget.txt | 4 | Sep. 20, 2010 |
| GeoRSSWidget2.txt | 25 | Jun. 26, 2012 |
| HeaderController | | |
| GroupWidgetItemDataGroupRenderer.txt | 4 | Sep. 15, 2010 |
| HeaderControllerWidget.txt | 4 | Jun. 02, 2011 |
| HeaderControllerWidget2.txt | 20 | Jun. 26, 2012 |
| HeaderGroup.txt | 4 | Sep. 15, 2010 |
| HeaderGroupSkin.txt | 4 | Jun. 01, 2010 |
| WidgetItemDataGroupRenderer.txt | 4 | Sep. 15, 2010 |

-continued

| Files | Size (KB) | Date Created |
|---|---|---|
| WidgetListItemRenderer.txt | 4 | Sep. 01, 2010 |
| heatmap | | |
| HeatMapTest.txt | 4 | Jun. 04, 2012 |
| HeatMapTest2.txt | 8 | Jun. 04, 2012 |
| HeatMapTimeTest.txt | 4 | May 08, 2012 |
| NewQuery | | |
| QueryWidget.txt | 4 | May 11, 2011 |
| QueryWidget2.txt | 16 | May 12, 2011 |
| OverviewMap | | |
| OverviewMapComponent.txt | 25 | Jun. 26, 2012 |
| OverviewMapWidget.txt | 4 | Aug. 24, 2010 |
| OverviewMapWidget2.txt | 4 | Dec. 07, 2010 |
| Search | | |
| SearchResultItemRenderer2.txt | 8 | Sep. 14, 2010 |
| SearchWidget_Louisville.txt | 4 | Oct. 19, 2010 |
| SearchWidget4.txt | 53 | Jun. 26, 2012 |
| Splash | | |
| SplashWidget.txt | 4 | Dec. 02, 2010 |
| SplashWidget2.txt | 4 | Oct. 19, 2010 |
| StaticImage | | |
| StaticImageWidget.txt | 4 | Nov. 30, 2010 |
| StaticImageWidget2.txt | 4 | Nov. 30, 2010 |

BACKGROUND OF THE INVENTION

Field of the Invention

The present invention relates to the field of computer mapping of incident location data. More specifically, the present invention relates to the interactive tool for location mapping and analysis of petrochemical incidents based on real time or historical data.

Description of the Related Art

Annually 3.1 billion tons of hazardous materials (hazmat) are transported across the United States by truck, rail, pipeline or marine vessel. The daily total is estimated at more than 817,000 shipments. The prevalence of shipments is by truck, (60 percent of all total hazmat shipments) along the nation's roadways and throughout cities and neighborhoods.

There are websites that provide information on various types of incidents, as a mapping function. Hazmat (www.hazmat.globalincidentmap.com/map.php) is one of these sites but it, however, shows "real-time" incidents and none that are historical in nature. Moreover, one cannot query additional information, such as local schools, hospitals, etc. nor can one download the data for further analysis. The data seem to come from media outlets and not from a government agency. There is also software that generates Hazmat compliant routes, such as www.pcmiler.com/products/pcmiler-hazmat.asp. Thus, there is a recognized need for a type of system that contains all the historical information alongside the critical infrastructures and real-time data that are easily available for first responder usage.

Therefore, the prior art is deficient in incident location and analysis systems that derive data from government agencies. Particularly, the prior art is deficient in a user interactive hazardous materials incident location system that can locate and analyze historical and real time incident information. The present invention fulfills this longstanding need and desire in the art.

SUMMARY OF THE INVENTION

The present invention is directed to a system for locating one or more hazardous material incidents in a geographical area of interest. The system comprises an electronic device having at least a processor, a memory and a display coupled to the processor and at least one network connection and a user interactive tool coupled to the electronic device. The user interactive tool comprises a plurality of activatable widgets comprising an interface, a plurality of databases accessible by the activatable widgets over the network connection; and a mapping application and displayable interactive base map coupled to the activatable widgets.

The present invention also is directed to a related system for locating one or more petrochemical incidents in a geographical area of interest in real time. The system comprises an electronic device having at least a processor, a memory and a display coupled to the processor and at least one network connection and a user interactive mapping tool coupled to the electronic device. The user interactive mapping tool comprises a plurality of databases accessible over the network connection, an interface comprising a plurality of activatable widgets that are configured to query the databases about petrochemical incident data in the geographical area of interest and retrieve in real time the same therefrom and a mapping application and displayable interactive base map coupled to the interface.

The present invention is directed further to a user-implemented method for locating a hazardous material incident in a geographical area of interest. The method comprises accessing the user interactive tool comprising the system described herein and user-activating one or more widgets displayed on the base map. The activated widgets query one or more databases and receive incident data retrieved from the databases thereby. The incident data is displayed on the base map.

The present invention is directed further still to a non-transitory machine-readable storage medium comprising processor executable instructions for performing the user-implemented method for locating a hazardous material incident in a geographical area of interest as described herein. The present invention is directed to a related method further comprising adjusting the interactive base map to display the geographical area of interest or to select another geographical area of interest.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

FIG. 3A is the example screen shot of FIG. 1D depicting the Attributes Query widget.

FIGS. 3B-3D are enlargements of the Attributes Query combo box illustrating the Target Layer and the Selection Results features.

FIGS. 4B-4C are enlargements of the Incidents by Area window illustrating the Select Incident Layer and the Download Format Layer.

FIGS. 5C-5D are enlargements of the Select Critical Facility layer and the Download Format Layer.

FIG. 6 is the example screen shot of FIG. 2D depicting the HotSpot Analysis widget.

FIG. 7A is the example screen shot of FIG. 2D depicting the Spatial Query widget.

FIGS. 7B-7D are enlargements of the Spatial Query window illustrating the State dropdown menu, the Select Incident Layer and the Download Format Layer.

FIG. 8A is the example screen shot of FIG. 2D zoomed in to highlight the Houston, Tex. area and depicting the Map Contents function.

FIGS. 9A-9B are example screen shots of an enlargement of FIG. 2D depicting the Measure function.

DETAILED DESCRIPTION OF THE INVENTION

Figure 1:
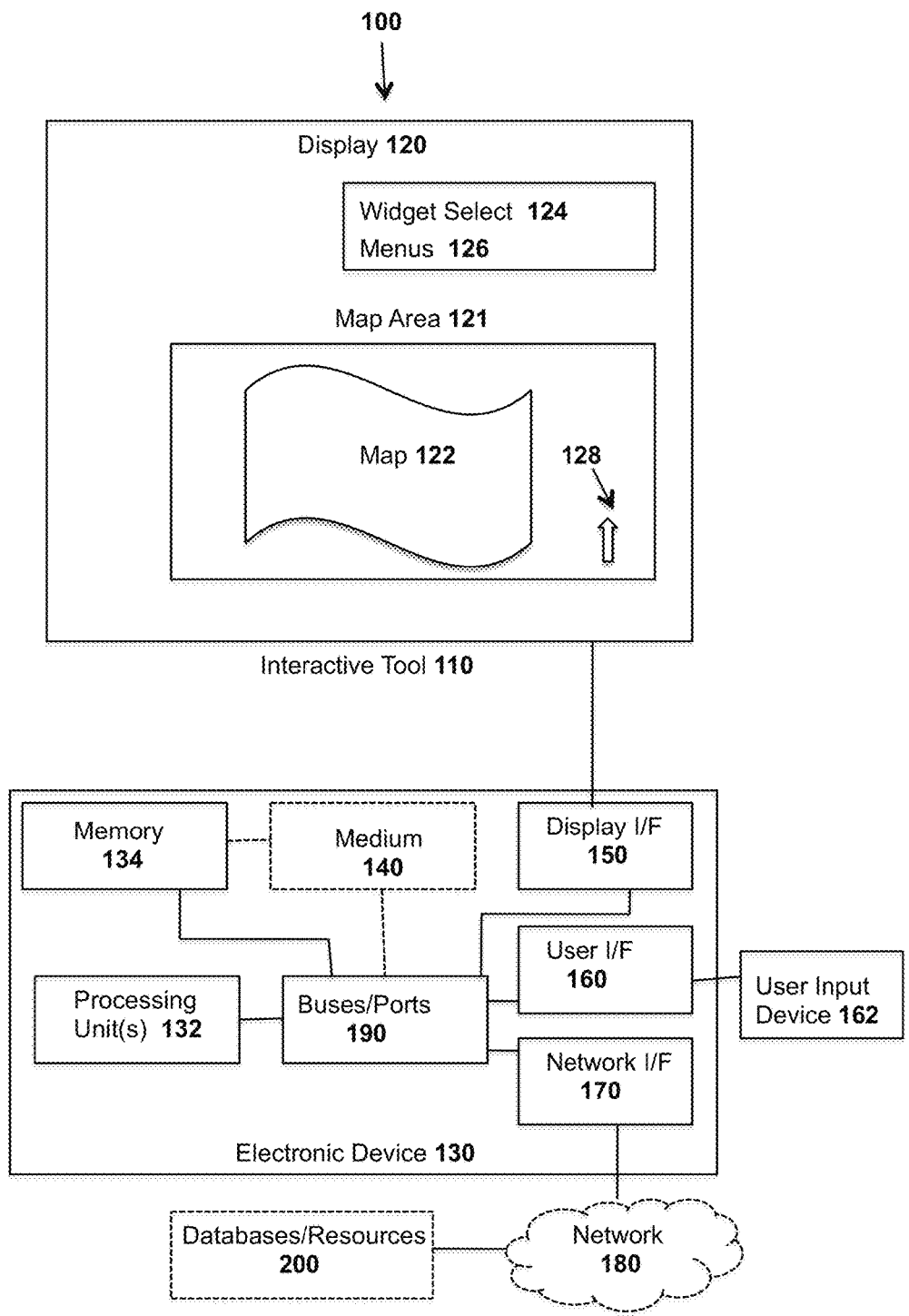
FIG. 1 is a block diagram of the Hazardous Materials Incident Location System

As used herein, the following terms and phrases shall have the meanings set forth below. Unless defined otherwise, all technical and scientific terms used herein have the same meaning as commonly understood to one of ordinary skill in the art.

As used herein, the term, "a" or "an" may mean one or more. As used herein in the claim(s), when used in conjunction with the word "comprising", the words "a" or "an" may mean one or more than one. As used herein "another" or "other" may mean at least a second or more of the same or different claim element or components thereof. The terms "comprise" and "comprising" are used in the inclusive, open sense, meaning that additional elements may be included.

As used herein, the term "or" in the claims refers to "and/or" unless explicitly indicated to refer to alternatives only or the alternatives are mutually exclusive, although the disclosure supports a definition that refers to only alternatives and "and/or".

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the terms "computer", "computing device", "computer system" or "electronic device" refers to one or more machines that comprise at least a memory, a processor, a display, one or more interfaces and at least one wired and/or wireless network connection. A computer may comprise a desktop or laptop machine or computer or other electronic media, for example, a smartphone or tablet, as are standard and currently known in the art. As such a computer may comprise a user input device such as a keyboard, keypad, touch screen, mouse, trackball, joystick, camera, microphone, and/or other like user input device. Without being limiting, any software, modules, applications, add-ons, plug-ins, programs and/or databases, etc. necessary for implementation of the hazardous materials incident location system may be programmed into the system, may be retrieved over the network connection or may be retrieved from a non-transitory machine-readable, such as computer readable, storage device tangibly storing the same, may be tangibly stored in computer memory or other electronic media memory and are executable by the processor.

As used herein, the terms "hazmat incident" or "hazardous materials incident" is an unintentional release of hazardous material(s) from a package during the course of transportation, including loading, unloading, and temporary storage.

As used herein, the terms "widget" or "query function" refer to those parts of the system, interactive tool or interface as described herein that allows a user to interface with the same. As defined and known in the art this may include, but is not limited to, buttons, radio buttons, dialog boxes, pop-up windows, pull-down menus, icons, scroll bars, resizable window edges, progress indicators, selection boxes, windows, tear-off menus, menu bars, toggle switches and forms.

As used herein, the term "Geographical Information System" or "GIS" refers to software, such as ArcGIS, that allows the user to transfer data onto a geographical point on a map. GIS uses information such as street addresses or (X,Y) coordinates to create this unique point via geocoding, i.e., the process that involves the input of these addresses.

As used herein, the term "Hot Spot Analysis" refers to a widget function that enables the users to better understand the spatial characteristics of the hazmat incidents. It shows the frequencies and years of hazmat incidents in different counties. Getis-Ord statistics are used for hot spots analysis to identify areas or spots continually affected by such incidents. Getis-Ord statistic features inform whether high low values tend to cluster in an area of interest.

As used herein, the term "CAMEO®" (Computer-Aided Management of Emergency Operations) or "CAMEO® Chemicals" refers to a tool created by the Environmental Protection Agency and is designed for people who are involved in hazardous material incident response and planning. This tool is part of the CAMEO software suite and it is available as a website and as a downloadable desktop application that is runnable on a personal computer. CAMEO Chemicals contains a library with thousands of datasheets containing response-related information and recommendations for hazardous materials that are commonly transported, used, or stored in the United States and is a reactivity prediction tool for predicting potential reactive hazards between chemicals.

As used herein, the term "Map Contents" refers to all layers that can be shown in the map.

As used herein, the term "Measure Function" refers to a function for drawing lines and shapes such as, a straight line, a freehand line, a rectangle, drawing a circle, a ellipse, a polygon, and a freehand polygon.

In one embodiment of the present invention there is provided a system for locating one or more hazardous material incidents in a geographical area of interest, comprising an electronic device having at least a processor, a memory and a display coupled to the processor and at least one network connection; and a user interactive tool coupled to the electronic device comprising a plurality of activatable widgets comprising an interface; a plurality of databases accessible by the activatable widgets over the network connection; and a mapping application and displayable interactive base map coupled to the activatable widgets.

In this embodiment the widgets may be configured to query the databases about user-selected incident data in the geographical area of interest and retrieve the same therefrom. Also, the interactive base map may be user-adjustable to display the geographical area of interest or to select another geographical area of interest. In addition the retrieved incident data may be displayable in the geographical area of interest on the base map. Examples of incident data are location, type of incident, type of hazardous material, time the incident occurred, closest critical facilities, incident hotspots, distances from the geographical area of interest or the critical facilities to the incident, or a combination thereof. Particularly, the geographical area of interest on the base map may range from a nation to a street address. Furthermore in this embodiment the incidents may occur in real-time or are historical incidents. An example of an incident may be a petrochemical incident.

In another embodiment of the present invention there is provided a user-implemented method for locating a hazardous material incident in a geographical area of interest, comprising the steps of accessing the user interactive tool comprising the system as described supra, user-activating one or more widgets displayed on the base map; querying one or more databases with the activated widgets; receiving incident data retrieved from the databases by the one or more activated widgets; and displaying the incident data on the base map. Further to this embodiment the method comprises adjusting the interactive base map to display the geographical area of interest or to select another geographical area of interest.

In one aspect of both embodiments the querying step may comprise requesting data about carriers of hazardous materials, type of hazardous material, type of incident or a combination thereof. In another aspect the querying step may comprise identifying critical facilities close to a specific incident. Further to this aspect the querying step may comprise calculating distances between the critical facilities and the specific incident. In yet another aspect the querying step may comprise requesting data about frequencies of occurrence and time of occurrence of incidents in the geographical area of interest. In yet another aspect the querying step may comprise calculating distances between incidents or between a user-selected location or area on the base map and the incidents. In both embodiments and all aspects thereof examples of a user may comprise a police department, a fire department, other first responders, a transportation carrier, a manufacturer of a hazardous material, or a state, city, county, or other local government.

In yet another embodiment of the present invention there is provided a non-transitory machine-readable storage medium comprising processor executable instructions for performing the method as described supra.

In yet another embodiment of the present invention there is provided a system for locating one or more petrochemical incidents in a geographical area of interest in real time, comprising an electronic device having at least a processor, a memory and a display coupled to the processor and at least one network connection; and a user interactive mapping tool coupled to the electronic device comprising a plurality of databases accessible over the network connection; an interface comprising a plurality of activatable widgets that are configured to query the databases about petrochemical incident data in the geographical area of interest and retrieve in real time the same therefrom; and a mapping application and displayable interactive base map coupled to the interface.

In this embodiment the retrieved incident data may be displayable in the geographical area of interest on the base map. Representative examples of incident data are location, type of incident, time the incident occurred, closest critical facilities, incident hotspots, distances from the geographical area of interest or the critical facilities to the incident, or a combination thereof. Also the interactive base map may be user-adjustable to display the geographical area of interest or to select another geographical area of interest. In addition the geographical area of interest on the base map ranges from a nation to a street address. Furthermore the user of the system may be a police department, a fire department, a transportation carrier, a manufacturer of a hazardous material, or a state, city, county, or other local government.

Provided herein is a system and method that comprises a an electronic device and an interoperable, interactive tool or interactive mapping tool available to acquire information as to the occurrence of incidents involving hazardous materials. This program incorporates a geographical information systems (GIS) on a mapping platform with a mapping application and displayable base map that facilitates companies and agencies as they visualize and monitor the system as a whole vis-à-vis physical, geographical and demographic data. The incident location system provides information to assist policy makers, emergency personnel or route planners in improving the efficiency and security of petrochemical transportation routes. The system is intended to help speed recovery and response by creating a program database that is available on the World Wide Web that is accessible by first responders, such as a police department or fire department, and other authorized agencies, for example, a state, county, city or other local government. In its full nationwide implementation and application, it can be used for pattern detection. Users of the system can query, analyze and display hazardous materials incidents, for example, but not limited to, petrochemical incidents, on a base map.

Particularly, the system displays historical and real time incidents, for example, but not limited to, from the present through about the past twenty years. The incident location system also displays critical infrastructures, such as, but not limited to, schools, hospitals, airports, bridges, ports, etc., in the vicinity of hazardous materials events. In addition direct access to the originator of incident data is provided, such as to the Pipeline and Hazardous Materials Safety Administration database (PHMSA) or other databases.

Also provided herein is the source code for the hazardous materials incident location system, such as for petrochemical incidents, as depicted in the figures described below. Table 1 identifies the widgets utilized in the system and their functions.

| File Title | Widget Title | Function |
|---|---|---|
| AttributeQueryWidget | Attribute Query | Queries incident data based on the attributes that incident management and emergency response officers may be interested. This widget is filtered by characteristics such as: Carriers Name, Explosion, Commodity, etc |
| ClosestFacilityWidget | Close Facility | Identifies critical facilities close to a specified hazmat incident. The facility layers include colleges, public schools, private schools, US ports, hospitals, bridges and population. |
| HotspotWidget | Hot Spot Analysis | Allows users to better understand the spatial characteristics of the hazmat incidents. It shows the frequencies and years of hazmat incidents in different counties. |
| SearchWidget | Spatial Query | Shows incidents that have occurred near a particular location. For example, users can locate a critical facility, such as a bridge, on the base map and find out how many hazmat incidents occurred within a given distance of this facility in a particular year. |
| MeasureDistance | Distance | Provides ability to identfy and/or calculate distance using different measurements. |
| Widget connection to the CAMEO databses sponsered by the EPA | CAMEO ® | A link to the EPA'S Cameo database with chemical standards and information. |
| Incident byAreaWidget | Incident by Area | Locates and identifies incidents in a specific area by using diferent drawing polygons |
| DrawWidget | Draw | Additional widgets to extract data |
| LayerList | Layers | Identifying the layers that are inside program data |
| QueryWidget | Query | Helps locate data and find additional attributes, such as carrier, company, by date, type of chemical. |

As described below, the invention provides a number of advantages and uses, however such advantages and uses are not limited by such description. Embodiments of the present invention are better illustrated with reference to the Figure (s), however, such reference is not meant to limit the present invention in any fashion. The embodiments and variations described in detail herein are to be interpreted by the appended claims and equivalents thereof.

FIG. 1 which is a block diagram illustrating a general architecture of the hazardous materials incident location system 100. Generally, the system comprises a user interactive tool 110 with at least one display device 120 operatively coupled in electronic communication to at least one computing or electronic device 130. As shown, the display device may be configured to selectively present a map area 121 displaying a map 122, a widget select item 124, menus 126, a cursor 128 and/or the like as directed by computing or electronic device 130. The map area may include all or part of the display. Widget select may graphically include one or more user selectable menu items comprising menus 126. Widget select may be interactively selected or otherwise invoked by a user to activate query functions and/or menus in the user interactive tool 110. The user interactive tool is configured to allow the user to manipulate the information displayed on map 122 in some manner based on user input.

Computing or electronic device 130 may be representative of one or more devices known in the art that may be adapted to accept or otherwise access user input and based, at least in part, on such user input generate and provide graphical data via an interface to display device 110 for presentation, such as in map area 121 and/or on map 122. As known and standard in the art, computing or electronic device 130 may include one or more processors or processing units 132 configured to process executable instructions, memory 134 operatively coupled in electronic communication to the processor, a non-transitory computer readable medium 140, such as comprising a storage device or other article of manufacture, interfaces, such as, but not limited to, a display interface 150, a user interface 160, a user input device 162 and one or more network interfaces 170 operably linked to or in electronic communication with one or more networks 180. Buses, ports or other coupling means 190 operatively couple the described components of the computing or electronic device one to the other and/or to the display device all as shown in FIG. 1.

The network interface 170 enables communication over a network 180 with one or more computing or electronic devices and/or, particularly, with databases 200 and other resources. A network may comprise any communication system, such as, the Internet. A non-limiting example of a database useful in the hazardous materials incident location system is the Pipeline and Hazardous Materials Safety Administration database. Generally, other resources may be one or more computing and/or other like devices that may exchange data and/or instructions with computing device 130.

The hazardous materials incident location system, widgets, tools, and methods provided herein may, be implemented using one computing device and/or may be implemented in a distributed or other like manner using two or more computing, smart devices or electronic devices and/or other like resources as are well-known and standard in the art. The following figures illustrate more comprehensively the interoperable, interaction query functions encompassed by Widget Select 124 and Menus 126 and displayed in the Map Area 121 comprising the interoperable, interactive tool.

Figure 2A:
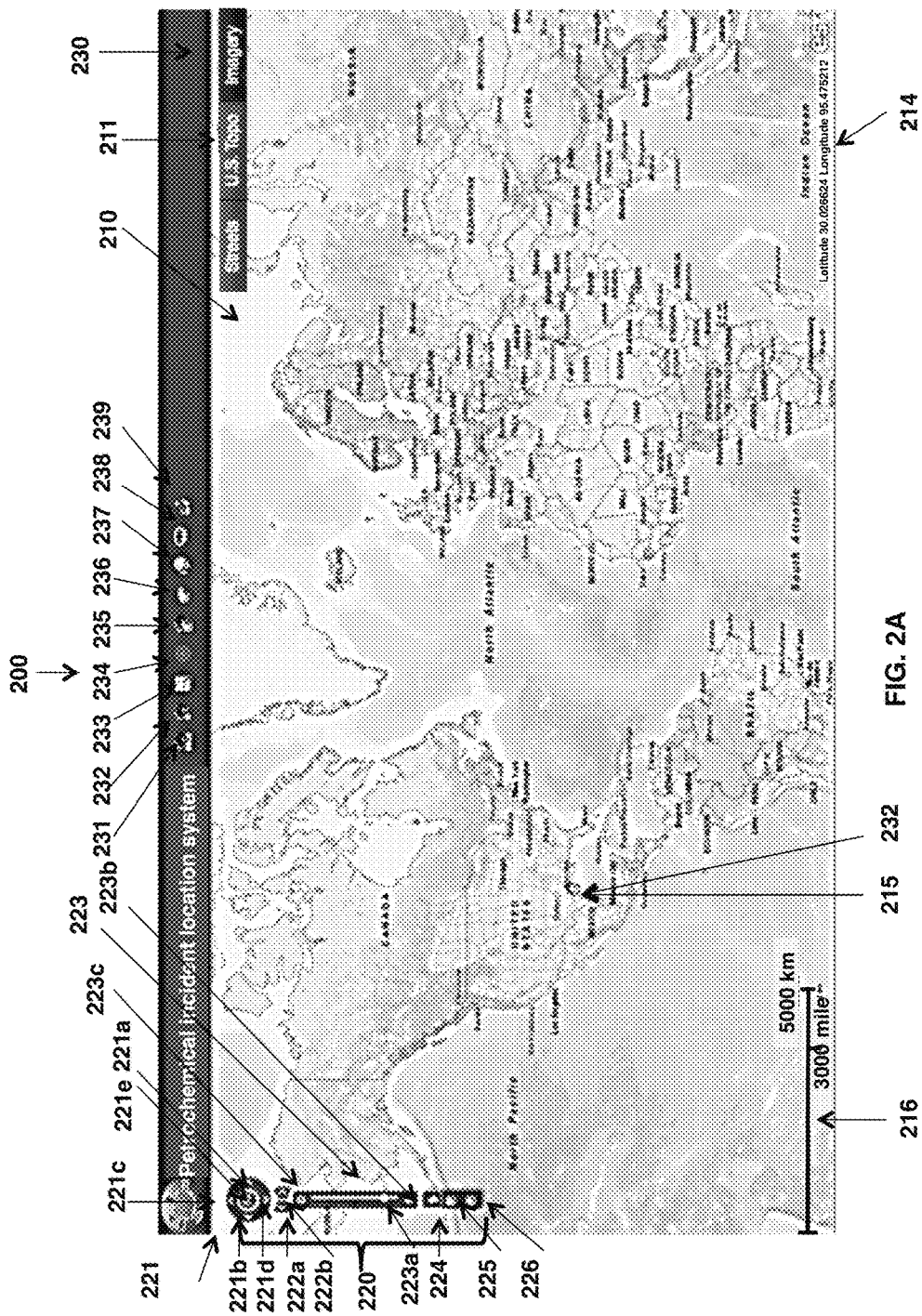
FIG. 2A is an example screen shot of the system depicting an interactive map illustrating the primary interstate or highway systems in a world map.
Figure 2B:
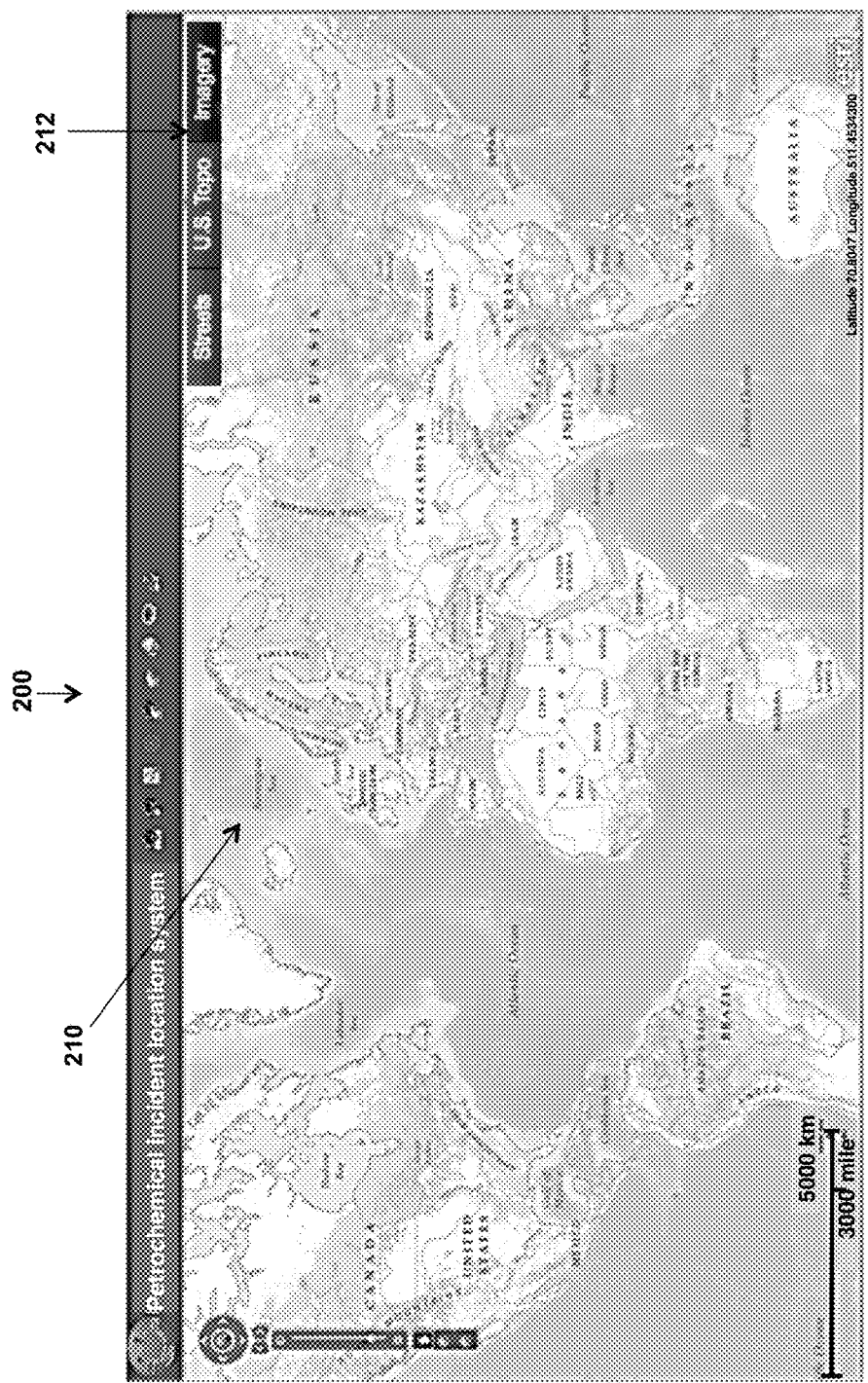
FIG. 2B is an example screen shot of FIG. 2A in topography mode.
Figure 2C:
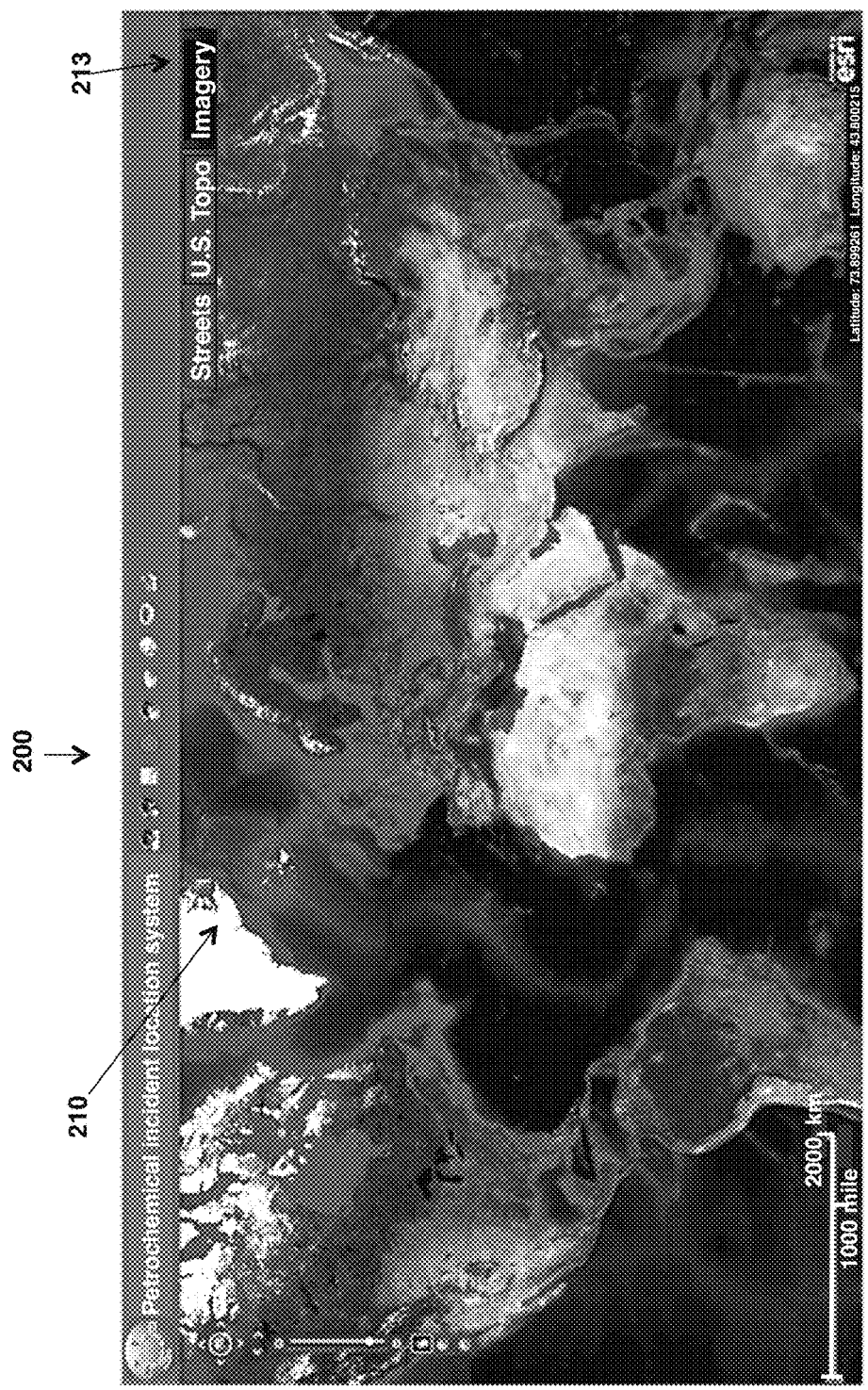
FIG. 2C is an example screen shot of FIG. 2A in satellite imagery mode.

FIGS. 2A, 2B, 2C, and 2D are screen shots of the hazardous materials incident location interactive tool. The interactive tool 200 comprises a map of the world 210 which, by clicking the corresponding radio button, can be shown in street 211 mode in FIGS. 2A and 2D, topography 212 mode in FIG. 2B or satellite imagery 213 mode in FIG. 2C. Referring to FIG. 2A, the interactive tool comprises a geopositioning feature 214 showing the latitude and longitude of any point on the map. For example the pan icon 224 (see FIG. 2D) is positioned on Houston, Tex. at 215 which is located at Latitude 30.026624 and Longitude 95.475212. The interactive tool further comprises a numerical map scale 216 that changes the scale or distance as a user zooms in or out on the map. For example, compare the 5000 meter scale in FIG. 2A with the 2000 meter scale in FIG. 2D which depicts FIG. 2A after zooming in to depict primarily North and Central America.

The interactive tool comprises pan and zoom features 220. A radiobutton 221 enables a user to pan right 221a, pan left 221*b*, pan up 221*c* or pan down 221 by clicking on the corresponding arrows or to zoom out completely by clicking on the button 221*e*. Moreover, a user can pan westward or eastward by clicking at 222*a* or 222*b*. Alternatively, moving the button 223*a* along the sliding scale 223 will enable a user to zoom out or zoom in between maximum zoom out at 223*b* and maximum zoom in at 223*c*. The button 224 enables a user to pan across the map by clicking and grabbing and moving the icon in any direction to reorient the map on the webpage. Double clicking the icon at a specific location will zoom in at that location. Button 225 enables a user to outline an area of interest and enlarge the delineated portion. As such, button 226 enables a user to reduce a delineated area of interest. A user can view any location in the world and is able to zoom out to view the entire world map or select a city, for example, and zoom in to view specific neighborhoods in street mode.

With continued reference to FIG. 2A, the interactive tool has a toolbar 230 comprising a plurality of widgets each with a specific function or query function in the interactive tool. The toolbar enables a user to independently make an Attributes Query 231, locate Incidents by Area 232, make a Proximity to Critical Facility Query 233, make a Hot Spot Analysis 234, make a Spatial Query 235, select a map layer with Map Contents 236, measure distance between locations or an area and/or perimeter around a location with the Measure Function 237, access a database at 238, for example, but not limited to the CAMEO database, and to Print 239.

Figure 2D:
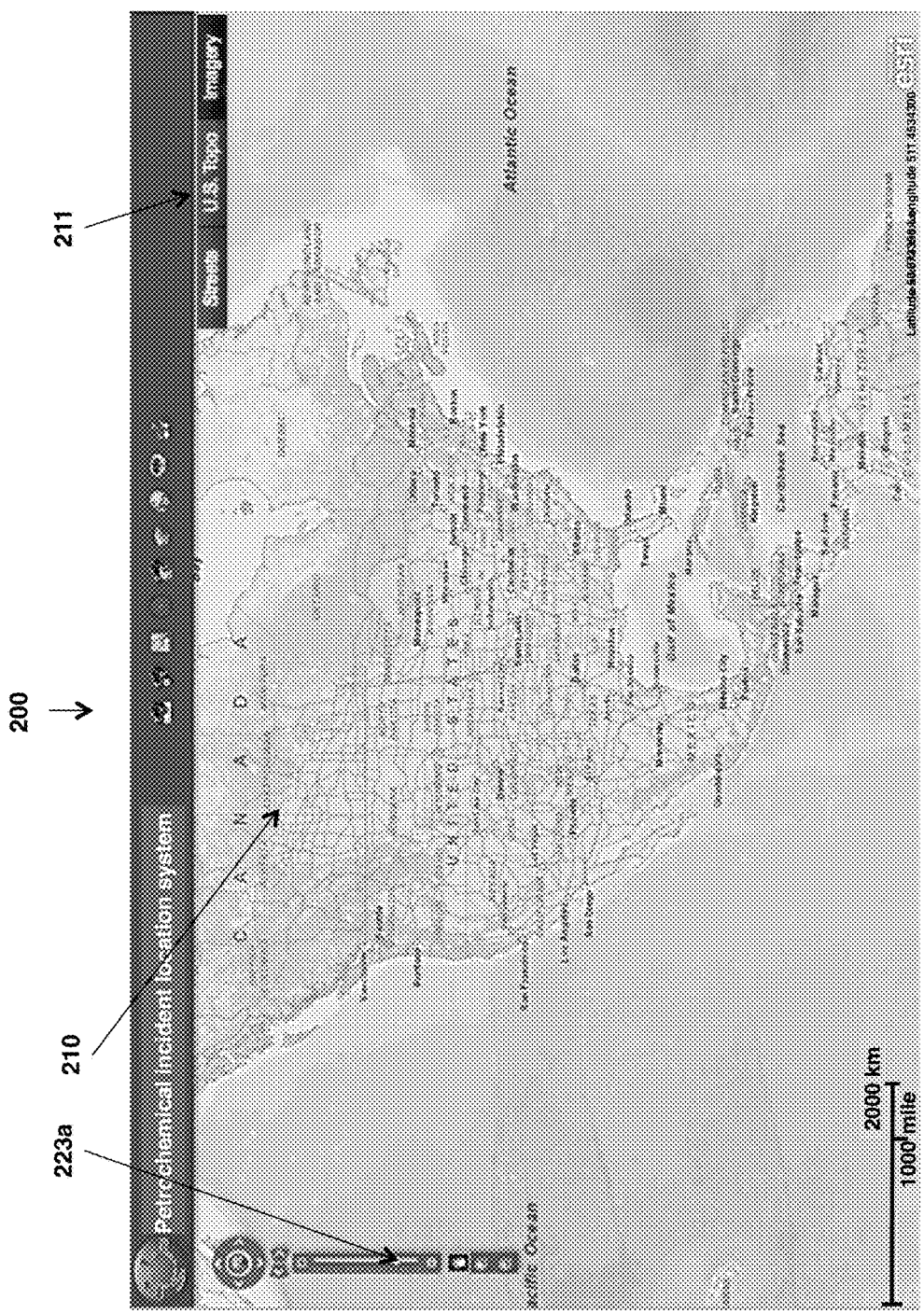
FIG. 2D is an example screen shot of FIG. 2A illustrating the zoom in feature to limit the map to primarily North and Central America.

With continued reference to FIGS. 2A and 2D, FIG. 3A depicts the interactive tool when the Attributes Query 231 widget is activated. A size-adjustable interactive combo window 310 is opened into which a user may input queries about incident data of interest to the user. The results obtained may be downloaded for further analysis. Generally, the interactive window comprises a dropdown Target Layer 315 from which a target year from 1993 to the present may be selected, a scrollable Fields 320 box from which a field of interest may be selected, for example, but not limited to, report number (RPTNO), carrier/reporter name (CARRI) or explosion (EXPLO), a Values 325 input box to construct a search using user inputted values and one or more of the Operators 330, for example, but not limited to, mathematical operators such as equal, less than, greater than, less than or equal to, greater than or equal to, percentage of, etc. and/or Boolean operators "Like", "and" and "or", and a Select * 335 input box with which to modify the search.

The interactive combo box comprises radiobuttons Select 340 and Clear 345. Select 340 is activated after a user has chosen a target year and set up the search. The radio button 340 is activated to open the Selection Results 360 window (see FIG. 3C). Results are exportable. Activating the radiobutton 345 returns the window to the interactive combo box 310. Clear 345 can be activated to clear the input and, if desired, conduct a new query. A user can minimize either combo box 310 or 360 at 350 or exit from either 310 or 360 at 355.

FIG. 3B illustrates the dropdown feature 316 listing the available target years through which a user may scroll and select. The year 2010 has been highlighted. FIG. 3C depicts the Selection Results 360 combo box that has a dropdown feature 362 which shows the total number of results for the selected year, in this instance for year 1993, and lists them in the field selected at 320. The combo box comprises buttons to clear 363 the window, zoom 364 and export data 365. FIG. 3D illustrates the dropdown menu 366 for feature 362.

Figure 4A:
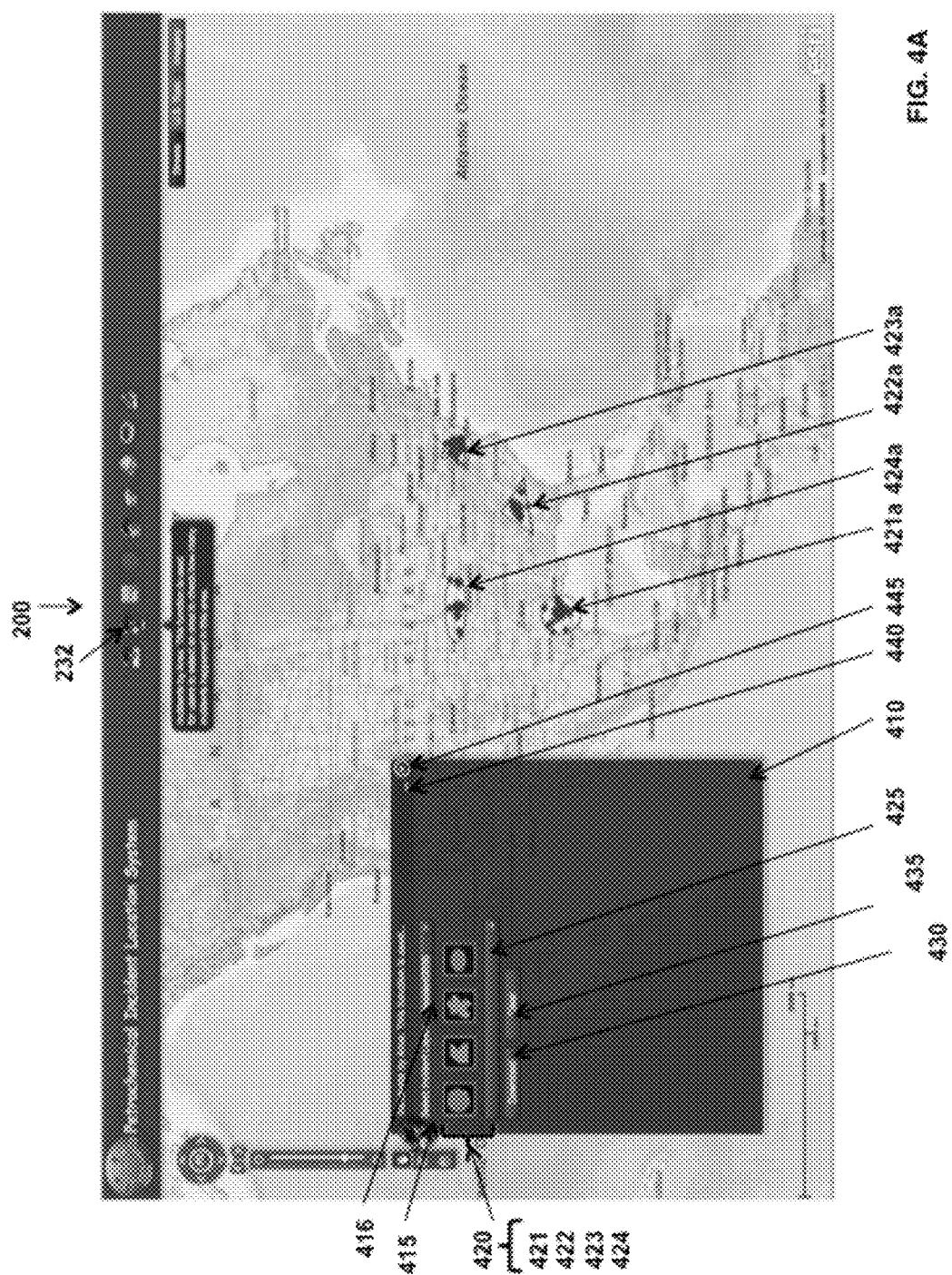
FIG. 4A is the example screen shot of FIG. 2D depicting the Incidents by Area widget and use.

With continued reference to FIGS. 2A and 2D, FIG. 4A depicts the interactive tool when the Incidents by Area Query 232 widget is activated. An interactive combo box 410 is opened into which a user may input queries about incident data within an area of interest drawn by the user. The results obtained may be downloaded for further analysis. Particularly, the Area Query window comprises a Select Incident Layer 415 with a dropdown feature 416 listing incident years from 1993 to the present. A Drawing Tool 420 comprises radiobuttons that enable a user to free draw an area of interest on the map by drawing a circle 421, a polygon 422, a free-hand polygon 423, and an ellipse 424. A user activates one of the buttons, clicks on the map at a point of interest, draws the shape and clicks to finish. For example, the Petrochemical Incident Location System map illustrates the incidents occurring in 2000 within a user drawn circle around Houston 421*a*, within a user drawn triangle 422*a* around Atlanta, within a free form polygon around Washington, D.C. 423*a*, and within an ellipse 424*a* around Kansas City. The interactive window has a dropdown feature 425 listing the formats with which the incident data can be downloaded, for example, File Geodatabase-GDB-.gdb, Shapefile-SHP-.shp, Autodesk Autocad-DXF_R2007-.dxf, Autodesk Autocad-DWG_R2007-.dwg, or Bentley Microstation Design(V8)-DGN_V8. The interactive window comprises radiobuttons Download 430 and Clear 435. A user may select a download format and click the button 430 to download the incidents highlighted on the map. Clear 435 can be activated to clear the input and, if desired, conduct a new query. A user can minimize the window 410 at 440 or exit from the window at 445.

FIG. 4B illustrates the dropdown feature 416 listing the available incident years through which a user may scroll and select in the Select Incident Layer 415. The year 2000 has been highlighted. FIG. 4C illustrates the 425 dropdown feature listing the available download formats.

Figure 5A:
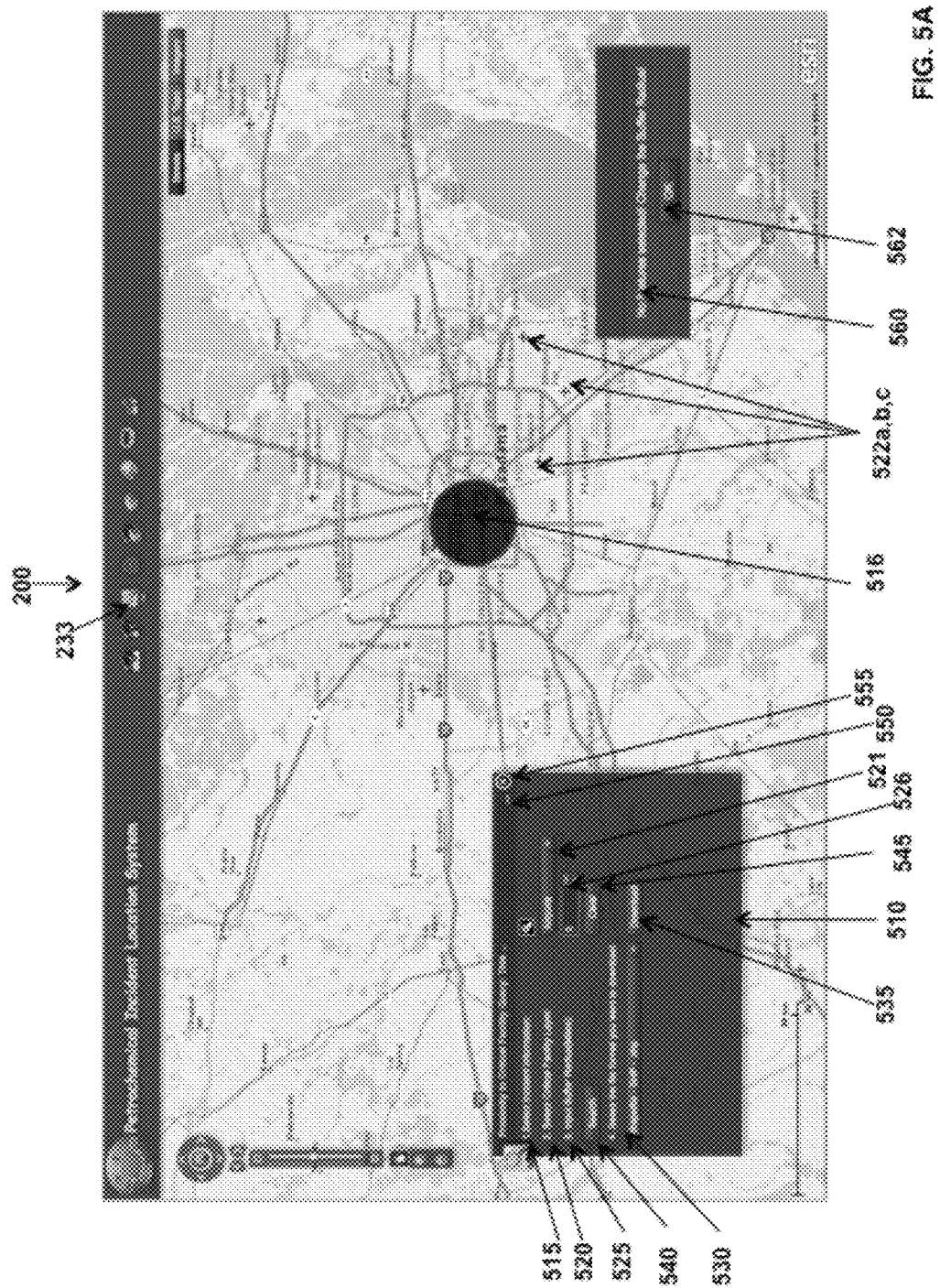
FIGS. 5A-5B are example screen shots of FIG. 2D zoomed in to highlight the Houston, Tex. area depicting the Proximity to Critical Facility Query widget and use.

With continued reference to FIGS. 2A and 2D, FIG. 5A depicts the interactive tool when the Proximity to Critical Facility Query 233 widget is activated. An interactive combo box 510 is opened into which a user may input queries about the proximity of selected critical facilities to an area of interest selected by the user with the select information tool. The results obtained may be downloaded for further analysis. Particularly, the Critical Facility Query window comprises a Select Incident Information 515 tool with which a user points and clicks at a point of interest. A Select Critical Facility Layer 520 comprises a scrollable dropdown feature 521 listing available critical facilities for mapping, such as, but not limited to, colleges/universities, public schools, private schools, airports, sports arenas, hospitals, and national bridges. A user may select an Input Buffer Radius 525 and scroll from 0 miles up by scrolling to the correct radius or highlighting and typing in the value at 526. The interactive window has a dropdown feature 530 listing the formats with which the incident data can be downloaded, as with the other interactive window 410, and a Download 535 button. A user can minimize the window 510 at 550 or exit from the window at 555 at any time. For example, in FIG. 5A, a user initially selects Houston, Tex. 516 to query for incident information proximate to airports, represented at least at 522*a,b,c*, within a 5 mile buffer radius. When the Search 540 button is activated and if no selected critical features are found within the selected incident area, a message window 560 opens and cues the user to increase the buffer radius by clicking on the button OK 562. The user may then increase the radius at 525 and search again or Clear 545 the window and input another query or Exit at 555.

Figure 5B:
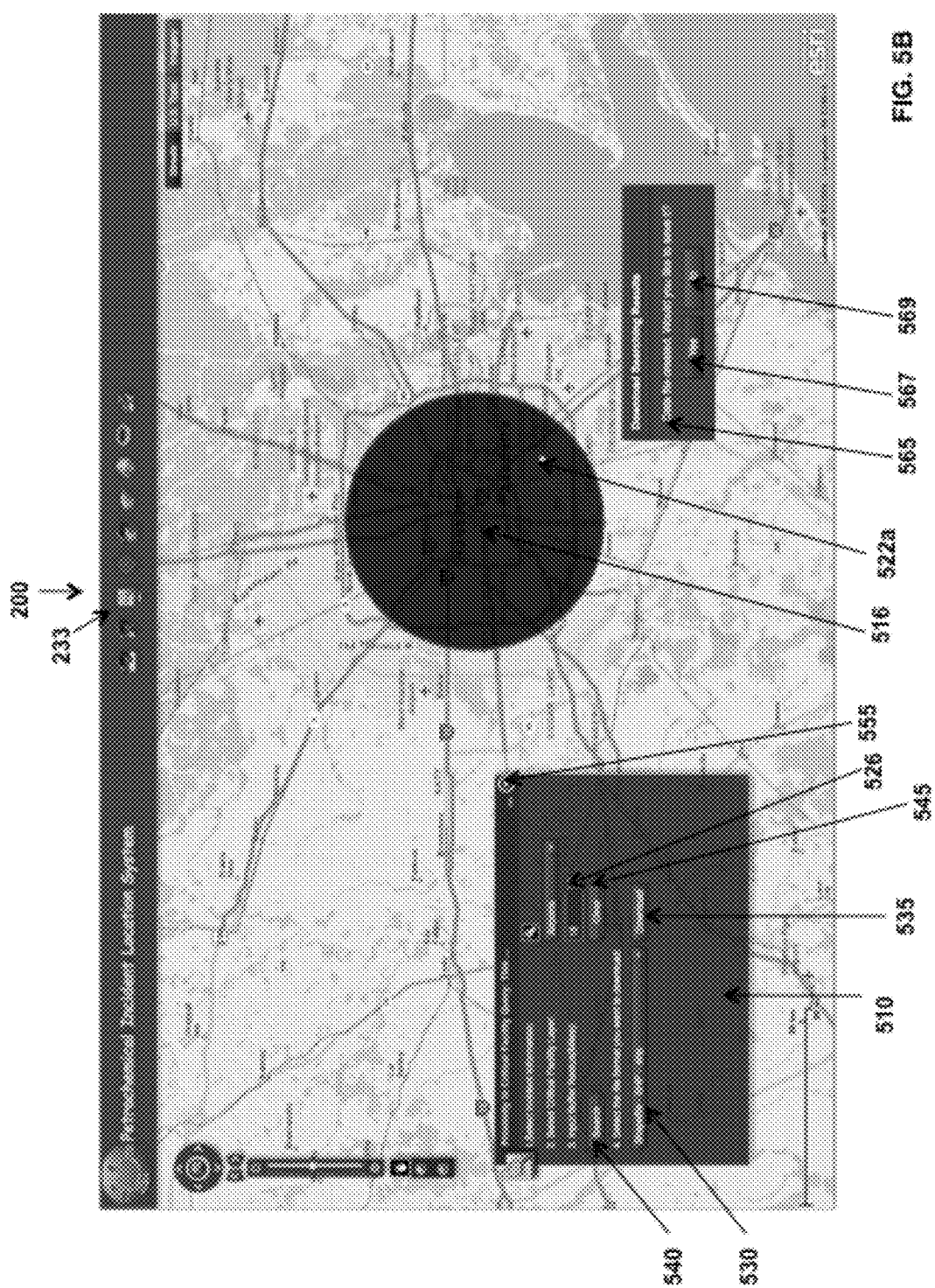

In FIG. 5B a user has changed the radius to 15 miles at 526 around Houston 516 and activates Search 530. The Petrochemical Incident Location System tool shows that an incident occurred proximate to the airport at 522a. A message window 565 opens and cues the user that a data file is created and asks if the file should be saved with Yes 567 or No 569 buttons. The user may Download 535 the results in the selected download Format 530 format for further analysis, then begin another query via Clear 545 or may Exit at 555.

FIG. 5C illustrates the dropdown feature 521 listing the available critical facilities through which a user may scroll and select in the Select Critical Facility Layer 515. The facility Airports 522a has been highlighted. FIG. 5D illustrates the Download 530 dropdown feature listing the available download formats.

With continued reference to FIGS. 2A, 2D, and 5A, FIG. 6 depicts the interactive tool when the Hotspot Analysis 234 widget is activated. This tool is applied to maps in which a user has selected an area of interest to query for one or more of incidents, critical facilities, a year of interest, etc. When the Hotspot Analysis widget is activated, the combo box 610 is opened which shows a color-coded chart for the year(s) selected for HotSpot Analysis. The years are selected by activating the Map Contents function 236 which opens a window 810 (see FIG. 7A) displaying layer visibility for incident years available for selection for HotSpot Analysis. In the Map Contents window the years 2010 and Overall are selected and thus the window 610 displays the color-coded legend for these years at 611a and 611b. The Proximity to Critical Facility Query 233 is activated and, within the window 510, the user selects incident information at 515, a critical facility layer(s) at 520 and an input buffer radius at 525. For example, the HotSpot Analysis occurs within a buffer of radius 616 of 174 miles around Houston 615 where airports, represented by 617a,b,c are the critical facility.

With continued reference to FIGS. 2A and 2D, FIG. 7A depicts the interactive tool when the Spatial Query 235 widget is activated. An interactive combo box 710 is opened into which a user may input queries about incidents occurring in a user selected area or at a specific user selected address during a year of interest. The results obtained may be downloaded for further analysis. Particularly, the Spatial Query 710 combo box comprises a Location tool 720 with which a user selects a location of interest and a Spatial Query tool 730 with which a user selects an incident year and/or critical facility of interest. The Location tool enables a user to Select a Location 722 by pointing and clicking on a point of interest on the Petrochemical Incident Location System map. Alternatively, the user may Enter an Address 723 by inputting a street name 724, city 725, selecting a state from the dropdown menu 726, and inputting a zipcode 727. Clicking Locate 728 will locate the address on the Petrochemical Incident Location System map. The Spatial Query widget enables a user to Select an Incident Layer 731 from a scrollable dropdown feature 732 which lists both available critical facilities for mapping, such as, but not limited to, colleges/universities, public schools, private schools, airports, sports arenas, hospitals, and national bridges and Incident Years from 1993 to the present. A user may select an Input Buffer Radius 733 to be displayed around the point or address of interest and scroll from 0 miles up by scrolling to the correct radius or highlighting and typing in the value at 734. The Spatial Query widget comprises a Search button 735 and Clear button 736 which function as described as in the Proximity to Critical Facility Query combo box 510. The interactive combo box has a dropdown feature 740 listing the formats 741 with which the incident data can be downloaded, as with the other interactive boxes or windows disclosed herein, and a Download 745 button. A user can minimize the windows or boxes 710 or 765 at 750 or exit from these windows at 755 at any time. The Spatial Query combo box or window comprises buttons to toggle between the Address screen 710 at 760 and a Results window 765 in which to display the results of the query.

For example, a user initially selects Houston, Tex. 722a via the point and click feature. The user opts to display airports, represented by 732a,b and selects an incident year of 2000 and incidents within a 20 mile buffer radius and a download format 741. When the Search 735 button is activated, all incidents, as represented by the diamonds, e.g., 732c,d,e within the selected area. If no incidents are displayed, the user may then increase the radius at 732 and search again or Clear 736 the window and input another query or Exit at 755. When incidents are mapped within the selected area, a user may download at 745 the results in the selected format 741, display the results in the Results window 765, Clear 736 the window for another query or Exit at 755.

FIG. 7B illustrates the State 626 dropdown menu in the Spatial Query widget 710 in which Texas is highlighted. FIG. 7C illustrates the Incident Layer 731 dropdown feature 732 listing, in this instance, critical facilities in which Airports is highlighted. Scrolling down brings a user to the available incident years, as depicted in FIG. 7A. Making a first selection of a critical facility, followed by an incident year, does not delete the critical facility input, or vice versa. FIG. 7D illustrates the Download 745 dropdown feature listing the available download formats.

Figures 8B, 8D:
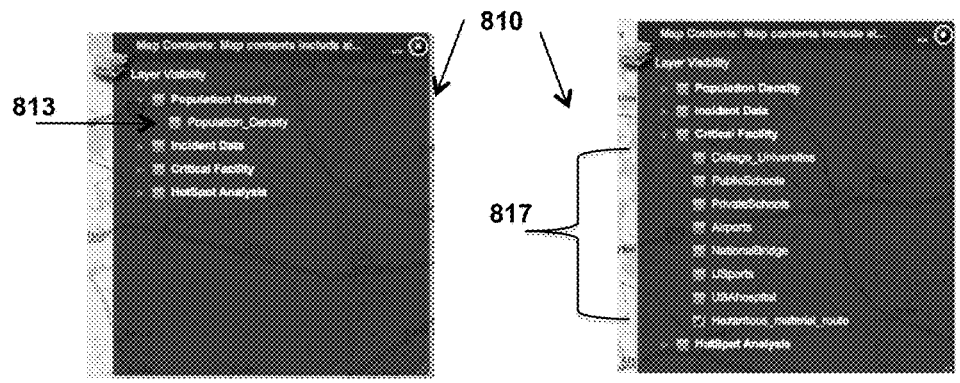
FIGS. 8B-8E are enlargements of the Map Contents window depicting the layer visibility for the Population Density Layer, the Incident Data Layer, the Critical Facility Layer, and the HotSpot Analysis Layer.
Figures 8C, 8E:
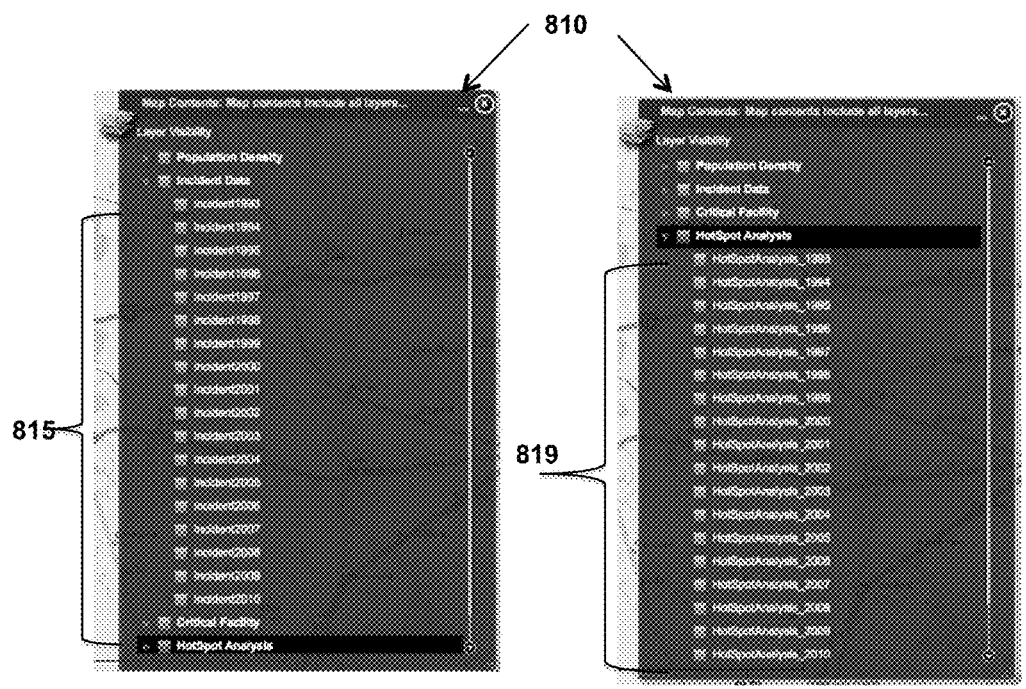

With continued reference to FIGS. 2A and 2D, FIG. 8A depicts the interactive tool when the Map Contents 236 widget is activated. A combox box or window 810 opens that lists all the specific layers that can be made visible on the map. Particularly, when viewing the window, a user may open one or more of a Population Density Layer 812, an Incident Data Layer 814, a Critical Facility Layer 816, and Hotspot Analysis 818 to view the respective dropdown menus. FIG. 8B illustrates that population density 813 may be selected and layered on the map in a user designated area. FIG. 8C illustrates that incident data is available from years 1993 to 2010 815. FIG. 8D illustrates that a user may select one or more critical facilities, as represented by 817, from among, but not limited to, colleges or universities, public schools, private schools, airports, national bridges, US sports arenas, US hospitals, and hazardous materials routes. FIG. 8E illustrates that hotspot analysis may be conducted for the same years 1993 to 2010 819 corresponding to the years for which incident data is available.

Figure 8F:
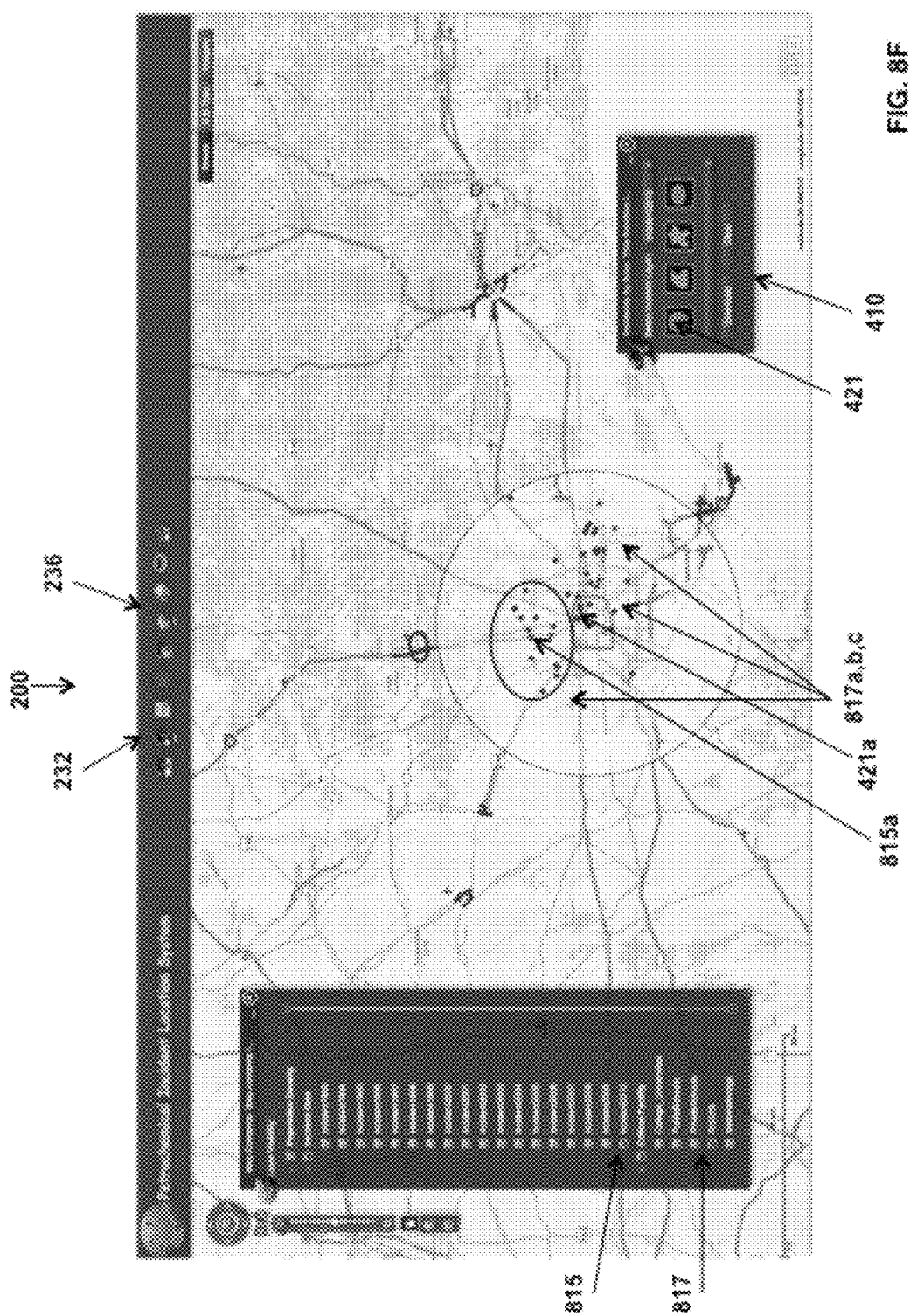
FIG. 8F illustrates a PILS map showing incident data for 2010 around the greater Houston area.

FIG. 8F shows the map for an incident year 2010 815 depicting airports, represented by 817a,b,c as the critical facility. Utilizing the Select Incident Layer 420 drawing tool in the Incidents by Area 410 window, a circle 421 was drawn around Houston, Tex. 421a encompassing about a 40 mile radius. Incidents occurring within the selected area during 2010 are shown as diamonds, for example, but not limited to, those as shown in the encircled area 815a.

With continued reference to FIGS. 2A and 2D, FIG. 9A depicts the interactive tool when the Measure 237 widget is activated. A combo box or window 910 opens that depicts a Drawing Tool 912 with a measuring function. The Drawing Tool comprises radiobuttons that enable a user to free draw a straight line 913 or free-hand line 914 between two points of interest on the map or to draw a rectangle/square area of interest on the map by drawing a circle 915, a polygon 916, a free-hand polygon 917, and an ellipse 918. When either of the straight line 913 or free-hand line 914 buttons are activated the Measure window 910 displays features enabling a user to select a Line Color 919 from dropdown color palette 920, to select an Alpha 921, which is the transparency of the line, by arrowing up and down from 0 to 1 at 922, to select a line Width 923 by arrowing up and down from 0 to 50 and to select a Style 924 for the line from a dropdown window 925 from among solid, dash, dot, dash-dot, or dash-dot-dot. Activating a Show Measurements 926 feature displays Distance Units 927, for example, but not limited to, meters, kilometers, feet and miles, in a dropdown menu 928. Moreover, the Measure 910 window may be minimized 950 or a user may Exit 955 at any time.

A user selects the characteristics of the line, activates one of the buttons 913 or 914, clicks on the map at a point of interest, draws the shape and clicks to finish. The distance between the points of interest is displayed on the map. For example, in FIG. 9A a free-hand dash-dot black line of width 2 and alpha 1 is drawn from Chicago to Houston 929 for a distance of 966.69 miles at 929a. A user may Clear drawings 940 at any time during the process for any selected shape.

Figure 9B:
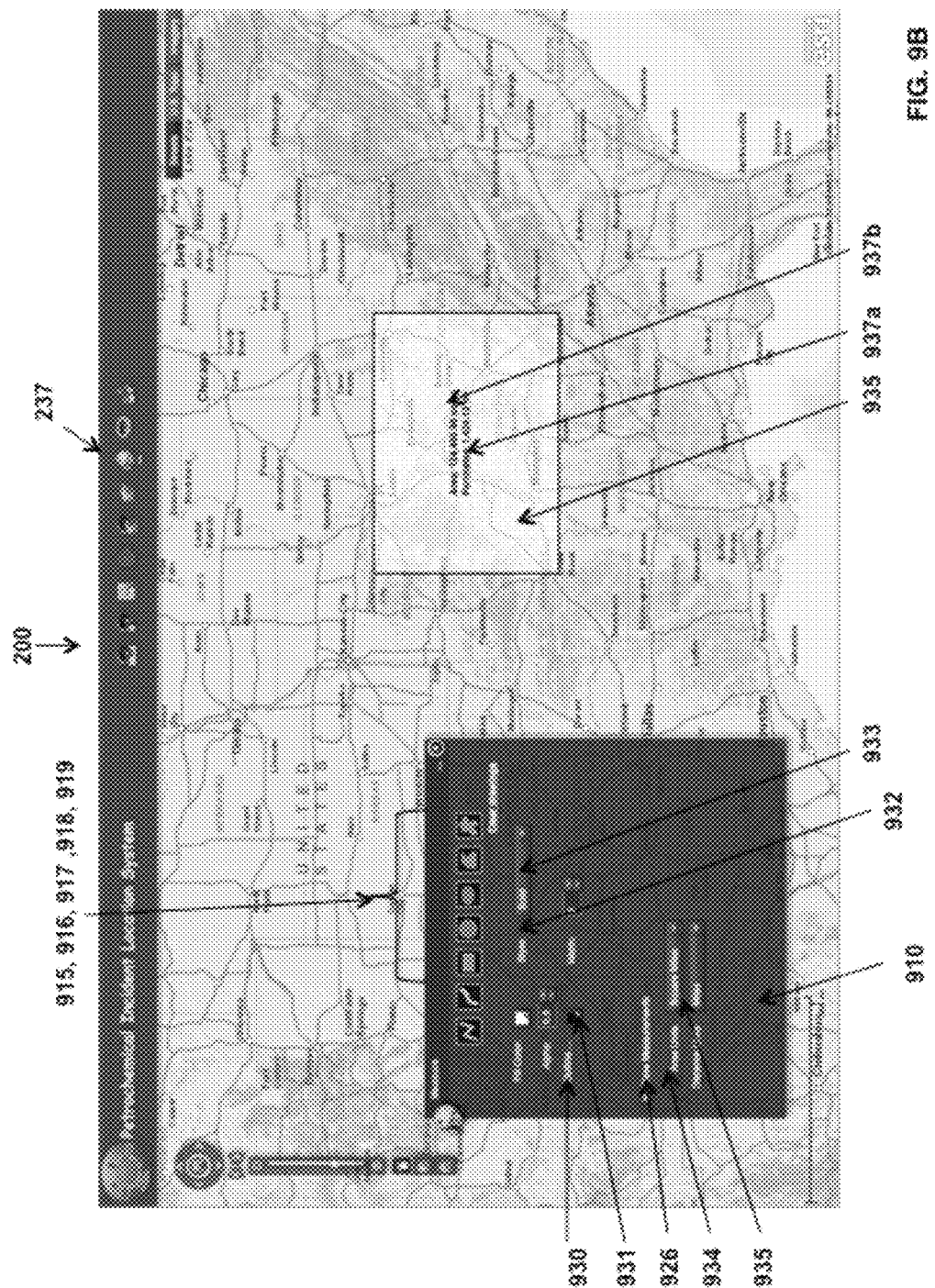

With continued reference to FIG. 9A, FIG. 9B depicts the Measure combo box or window 910 when one of the polygon buttons 915, 916, 917, 918, or 919 is activated. The Measure 910 displays the additional features of Outline 930 color from a dropdown color palette 931 and Style 932 in which the type of lining or hashing may be selected, for example, but not limited to, solid, cross, backward diagonal, forward, diagonal, horizontal, or vertical, is displayed in the dropdown menu 933. When Show Measurements 926 is activated Area Units 934 is displayed in which a user may select the units to measure the area in the drawn shape, for example, but not limited to, square meters, square kilometers, square feet, square miles, acres, or hectares, in the dropdown menu 935.

A user selects the characteristics of the circle, ellipse, or polygone, activates one of the buttons 915, 916, 917, 918, or 919, clicks on the map at a point of interest, draws the shape and clicks to finish. The distance around the perimeter of the drawn shape and the area is displayed on the map. For example, in FIG. 9B a square 935, outlined in black line with solid white fill, of line width 2 and alpha 0.5 is drawn with Jefferson City, the Louisville area, the Chattanooga area and Little Rock forming the corners. The perimeter distance 937a is 1,424.12 miles and the area 937b is 124,400.96 square miles. A user may Clear drawings 940 at any time during the process for any selected shape.

Figure 9C:
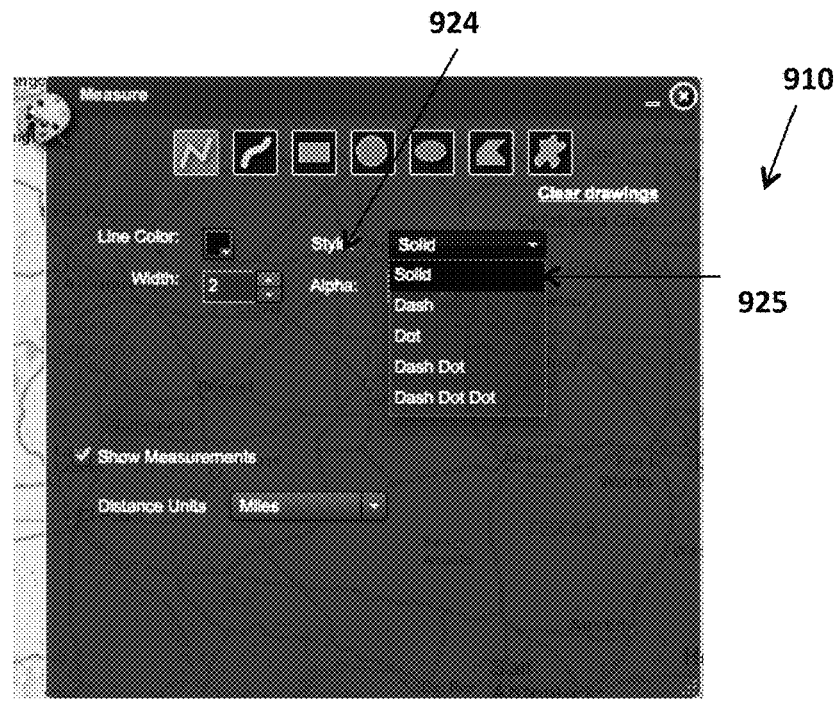
FIGS. 9C-9F are enlargements of the Measure window depicting the drawing formatting features with the dropdown menus for Style and Distance Units for drawn lines and the dropdown menus for Style and Area Units for drawn polygons.
Figure 9D:
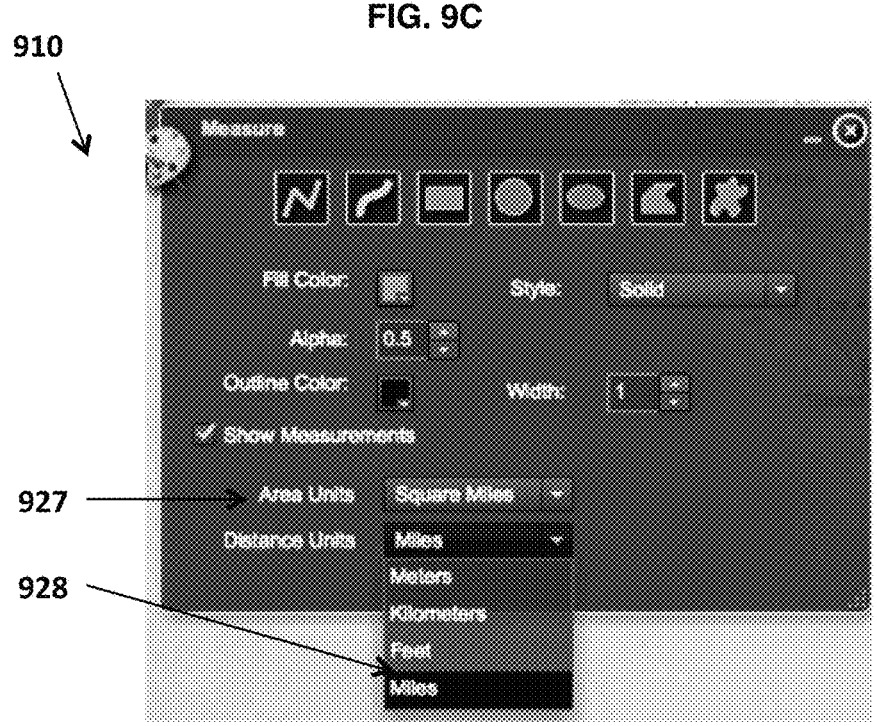
Figure 9E:
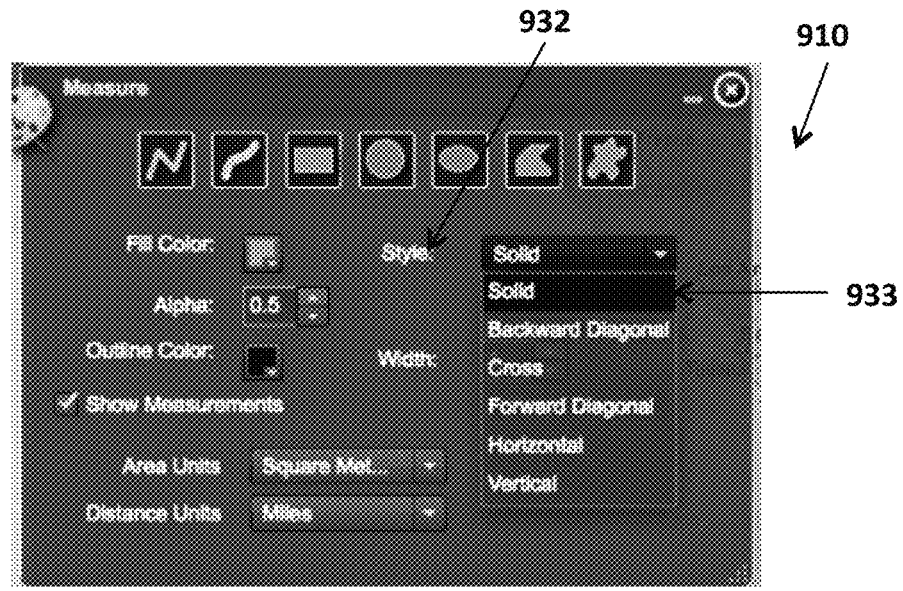
Figure 9F:
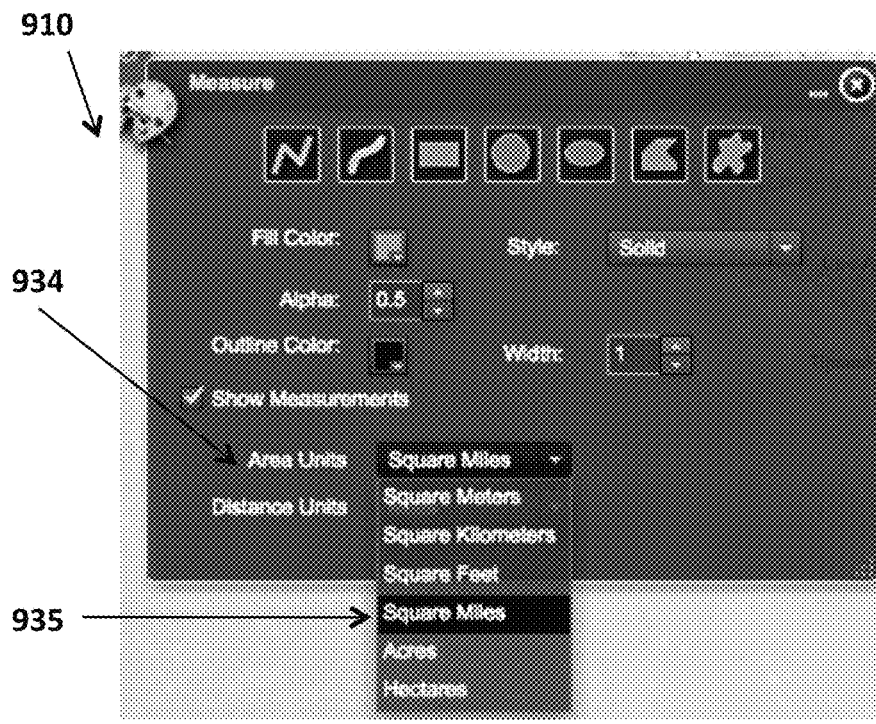

FIG. 9C illustrates the types of line Styles 924 displayed in the dropdown menu 926 for line drawings. Solid is highlighted. FIG. 9D illustrates the types of Distance Units 927 in the dropdown menu 928. Miles is highlighted. FIG. 9E illustrates the types of lining or hashing Styles 932 displayed in the dropdown menu 933 for shape drawings. Solid is highlighted. FIG. 9F illustrates the types of Area Units 934 in the dropdown menu 934. Square miles is highlighted.

Figure 10:
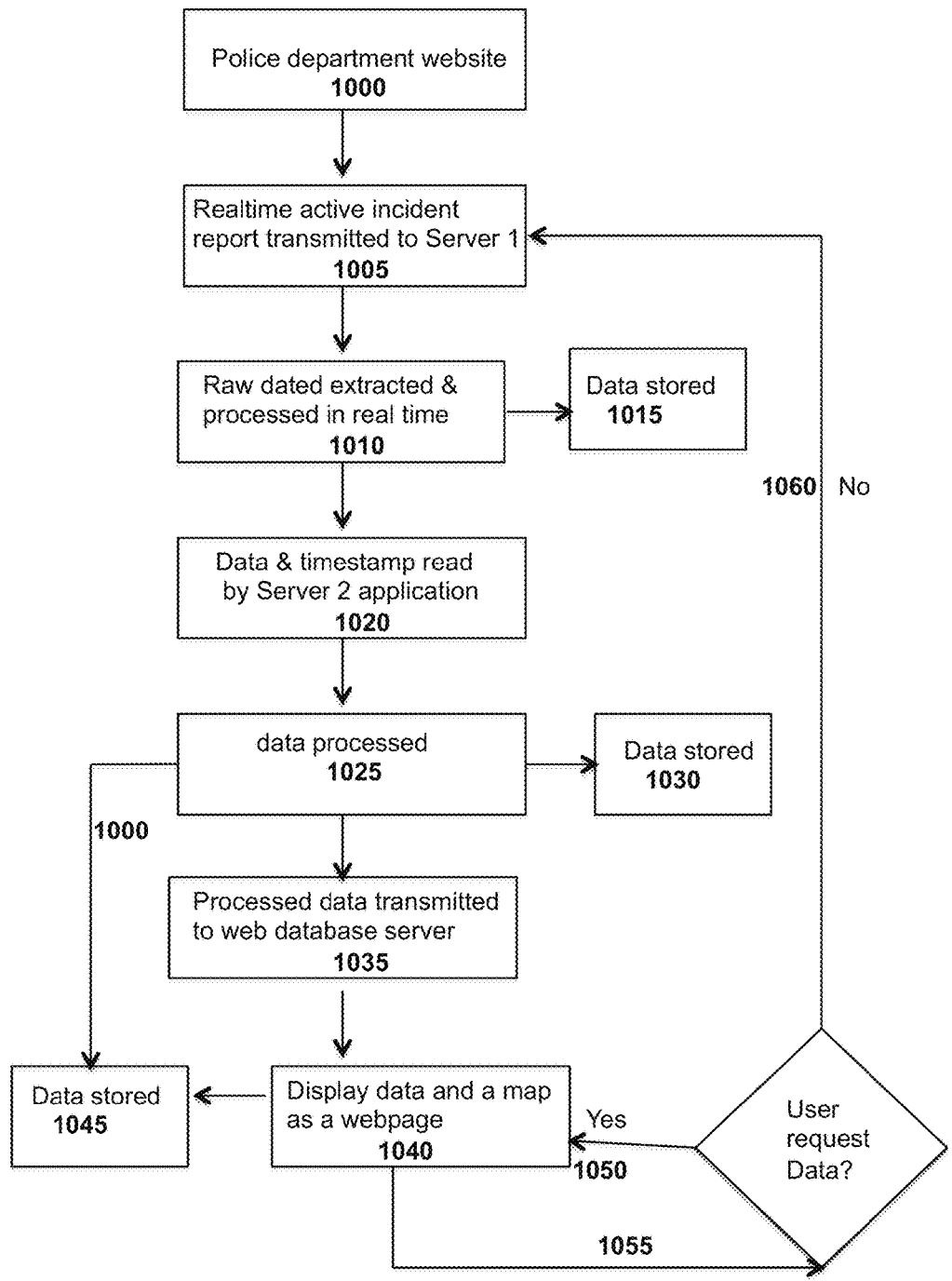
FIG. 10 is a flowchart of a hazardous materials incident location system process in real time.

FIG. 10 is a flowchart depicting a representative process for utilizing the hazardous materials incident location system by an authorized user, for example, a police department or a fire department. A real-time hazardous incident location system comprises, for example, a first server (Server1), a second server (Server2) and a Web Server. These servers are interconnected with a high speed network connection and communicate constantly in real time.

The Server1 machine hosts two applications that persistently monitor the website of the authorized user and retrieves its real time information. The Server2 machine hosts a first application that persistently monitors the Server1 machine's local data repository, retrieves the files, and stores them into both its local data repository and Web Server database. There is a direct network link that guarantees a persistent interconnection between the two Servers1 and 2 to guarantee the connectivity to and interaction with one another without any disruptions. The Web Server may use technology, such as Microsoft® MVC (Model-View-Controller), to allow dynamic websites to interact with its database and a mapping service, such as Microsoft® Bing Maps service. The Web Server also hosts the web service.

For example, a police department may maintain an Active Incident Report (AIR) page on its website 1000 where the incidents to which officers are dispatched are posted in near real time, i.e., every five minutes. The data collection application that runs on Server1 activates at five minute intervals and opens the Active Incident Report webpage 1005. When the report is open the entire page that includes a table or other format for collating and presenting data listing the incident reports is scanned.

A second application then extracts and processes 1010 the scanned raw data to keep only a unique incident report. The processed data is saved as an individual file and stored 1015 in a local data repository. Therefore, a total of 12 data files are retained in each hour or 288 data files each day. The data may contain Responder Type: police department (PD) or fire department (FD); Location: Address or intersection/road name, city, state, and zip code; and Report Date and Time. The data may contain the intersection or road name instead of the address because an address may not always be available, so that the intersection of the nearest road information is actively utilized.

The application running in Server2 monitors Server1's repository to check the latest data file along with its timestamp in a constant time interval. The application compares its own timestamp and the timestamp of the file. If the application recognizes the file has a later timestamp than its own timestamp, it reads the file 1020, processes 1025 the file's data, and saves it into the databases that reside in both Server2's local repository 1030 and the Web Server database 1045. The data in Server2's local repository serves as a redundant database to protect the data in case the data in the Web Server database suffers a catastrophic failure.

While processing the data, the application reads the location information and obtains the latitude and longitude (Lat/Long) information of each incident. The Lat/Long information also is added into the local repository 1030 and Web Server 1045. By establishing triple data redundancy on three separate systems, that is, data in Server1's local repository, Server2's local repository and the Web Server's database, the security of the data is enhanced. The data can be recovered even if two out of three systems fail due to system failure, for example, machine, hard-disk, or operating system failure, human errors such as accidental erasures, viruses, or cyber attacks.

The data transmitted 1035 to the Web Server may be displayed 1040 on a map. The Web Server may receive a request for the data from a user which can be transmitted 1055 thereto. If no request has been made 1060, the system continues to transmit the incident report at five minute intervals.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A user-implemented method for locating one or more petrochemical incidents in a geographical area of interest, comprising the steps of:
    accessing a system comprising:
        an electronic device having at least a processor, a memory and a display coupled to the processor and at least one network connection; and
        a user interactive mapping tool coupled to the electronic device comprising:
            a plurality of databases with petrochemical incident data and critical infrastructure data accessible over the network connection;
            an interface comprising a plurality of activatable widgets, said activatable widgets configured to query the plurality of databases about user-selected petrochemical incidents and critical infrastructures in the geographical area of interest and to retrieve from said databases both historical petrochemical incident data and real-time petrochemical incident data and data identifying critical infrastructure close thereto; and
            a mapping application and a user-adjustable, displayable interactive base map coupled to the interface;
    user-activating one or more of the activatable widgets displayed on the user-adjustable, displayable interactive base map comprising the user interactive tool;
    querying the databases comprising the user interactive mapping tool for both of the historical petrochemical incident data and the real-time petrochemical incident data and the data identifying critical infrastructure close thereto with the activatable widgets;
    receiving both of the historical petrochemical incident data and the real-time petrochemical incident data and the data identifying critical infrastructure close thereto retrieved from the databases by the one or more activatable widgets; and
    displaying in the geographical area of interest both of the historical petrochemical incident data and the real-time petrochemical incident data and the data identifying critical infrastructure close thereto on the user-adjustable, displayable interactive base map.

2. The user-implemented method of claim 1, further comprising user-adjusting the displayable interactive base map to select another geographical area of interest.

3. The user-implemented method of claim 1, wherein the querying step comprises requesting data about carriers of petrochemicals, type of petrochemicals, type of incident or a combination thereof.

4. The user-implemented method of claim 1, wherein the querying step further comprises calculating distances between the critical infrastructure and the specific petrochemical incident.

5. The user-implemented method of claim 1, wherein the querying step comprises requesting data about frequencies of occurrence and time of occurrence of petrochemical incidents in the geographical area of interest.

6. The user-implemented method of claim 1, wherein the querying step comprises calculating distances between petrochemical incidents or between a user-selected location or area on the user-adjustable, displayable interactive base map and the petrochemical incidents.

7. The user-implemented method of claim 1, wherein a user is a police department, a fire department, other first responders, a transportation carrier, a manufacturer of a hazardous material, or a state, city, county, or other local government.

8. The method of claim 1, wherein the petrochemical incident data comprises location, type of petrochemical incident, time the petrochemical incident occurred, closest critical infrastructure, petrochemical incident hotspots, distances from the geographical area of interest or the critical infrastructure to the petrochemical incident, or a combination thereof.

9. The method of claim 1, wherein the geographical area of interest on the user-adjustable, displayable interactive base map ranges from a nation to a street address.

* * * * *